(12) United States Patent
Raghavan et al.

(10) Patent No.: US 11,929,817 B1
(45) Date of Patent: Mar. 12, 2024

(54) METHODS FOR LOW-COMPLEXITY DYNAMIC POLARIZATION COMBINING

(71) Applicant: QUALCOMM Incorporated, San Diego, CA (US)

(72) Inventors: Vasanthan Raghavan, West Windsor Township, NJ (US); Juergen Cezanne, Ocean Township, NJ (US); Mohammad Ali Tassoudji, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 5 days.

(21) Appl. No.: 17/933,449

(22) Filed: Sep. 19, 2022

(51) Int. Cl.
*H04B 7/155* (2006.01)

(52) U.S. Cl.
CPC ....... *H04B 7/1555* (2013.01); *H04B 7/15571* (2013.01)

(58) Field of Classification Search
CPC .... H04B 7/0456; H04B 17/364; H04B 7/086; H04B 7/0671; H04B 7/088; H04B 7/024; H04B 7/1555; H04B 7/15571; H04B 7/15578; H04B 7/15585; H04B 7/15542; H04B 7/15528; H04B 7/0691; H04B 17/309; H04L 5/0023; H04L 5/0035; H04L 27/2607; H04L 27/2675; H04L 1/0026

See application file for complete search history.

(56) References Cited

U.S. PATENT DOCUMENTS

| | | | |
|---|---|---|---|
| 2015/0123864 A1* | 5/2015 | Boryssenko | H01Q 21/0006 343/816 |
| 2017/0062952 A1* | 3/2017 | Sundararajan | H01Q 1/246 |
| 2018/0063693 A1* | 3/2018 | Chakraborty | H04W 8/005 |
| 2021/0151874 A1* | 5/2021 | Sudo | H01Q 1/523 |

* cited by examiner

*Primary Examiner* — Khanh C Tran
(74) *Attorney, Agent, or Firm* — Procopio, Cory, Hargreaves & Savitch LLP

(57) ABSTRACT

Method and apparatus for dynamic polarization combining. The apparatus identifies a first polarization of a first set of antenna elements on a first side of an antenna module having two or more sides. The apparatus identifies a second polarization of a second set of antenna elements on a second side of the antenna module. The apparatus determines, for an antenna layer, a dynamic polarization combination between the first set of antenna elements having the first polarization with the second set of antenna elements having the second polarization. The apparatus communicates with a network node via the antenna module based on the dynamic polarization combination.

30 Claims, 15 Drawing Sheets

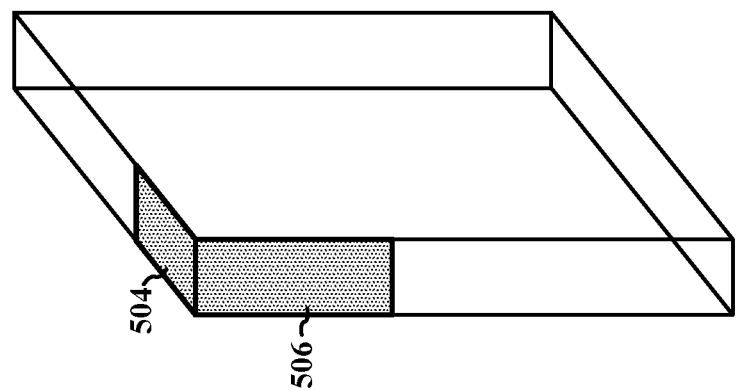
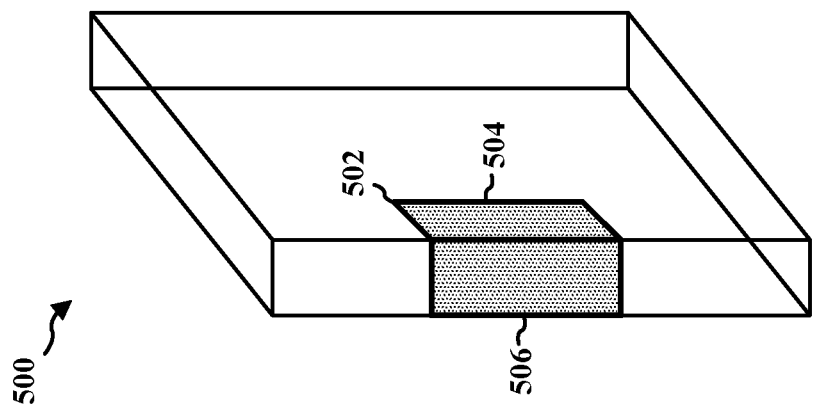
FIG. 5

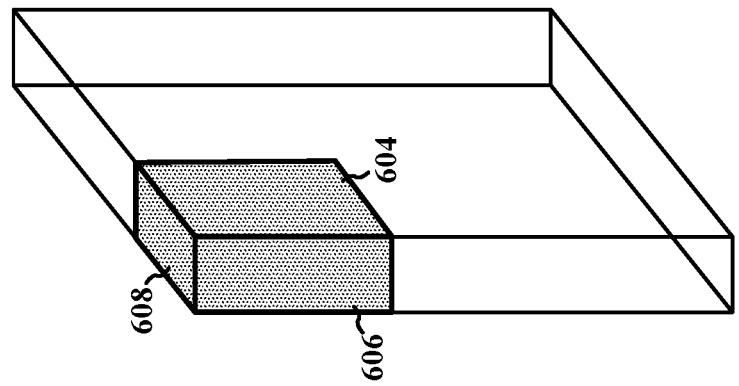
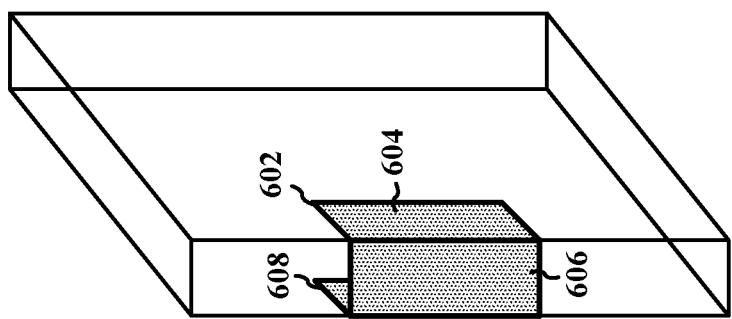
FIG. 6

METHODS FOR LOW-COMPLEXITY DYNAMIC POLARIZATION COMBINING

TECHNICAL FIELD

The present disclosure relates generally to communication systems, and more particularly, to a configuration for dynamic polarization combining.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a device at a UE. The device may be a processor and/or a modem at a UE or the UE itself. The apparatus identifies a first polarization of a first set of antenna elements on a first side of an antenna module having two or more sides. The apparatus identifies a second polarization of a second set of antenna elements on a second side of the antenna module. The apparatus determines, for an antenna layer, a dynamic polarization combination between the first set of antenna elements having the first polarization with the second set of antenna elements having the second polarization. The apparatus communicates with a network entity via the antenna module based on the dynamic polarization combination.

In an aspect of the disclosure, a method, a computer-readable medium, and an apparatus are provided. The apparatus may be a device at a network entity. The device may be a processor and/or a modem at a network entity or the network entity itself. The apparatus obtains an antenna module capability indication indicating that a user equipment (UE) supports dynamic polarization combination or indicating a type of antenna module utilized at the UE. The apparatus configures, based on the antenna module capability indication, a reference signal configuration for the UE to conduct measurements of a plurality of reference signals at a first side of the antenna module and a second side of the antenna module.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 5 is a diagram illustrating an example of an antenna module.

FIG. 6 is a diagram illustrating an example of an antenna module.

DETAILED DESCRIPTION

Figure 1:
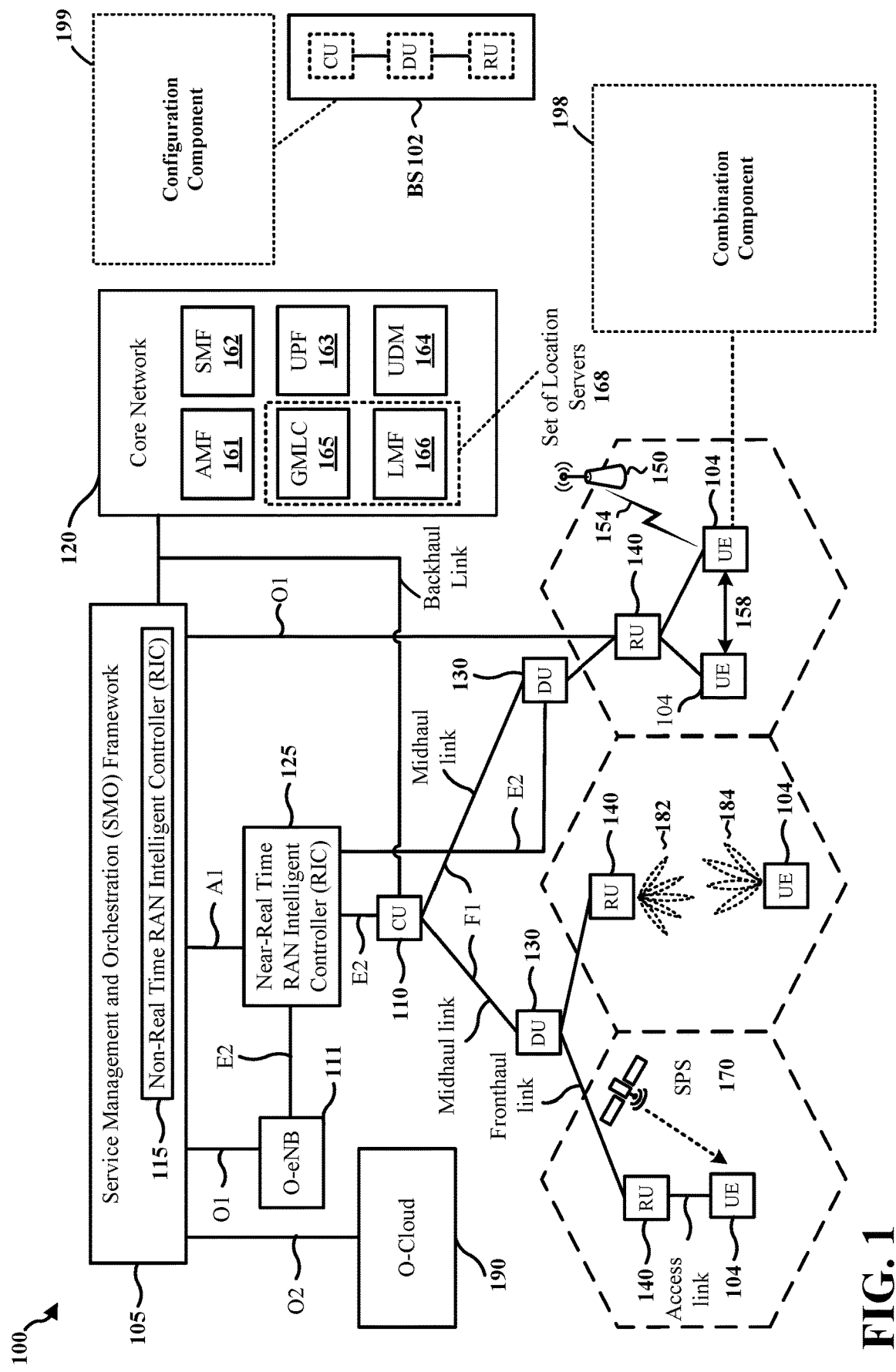
FIG. 1 is a diagram illustrating an example of a wireless communications system and an access network.

In wireless communications, such as but not limited to millimeter wave systems, multiple antennas may be used at the UE and at the base station. Multiple antenna modules/panels, within each antenna module, have a set of antenna elements that may be co-phased when beamforming is utilized. The use of multiple antenna modules may allow for the ability to meet spherical coverage requirements with or without signal blockage due to hand, head, or any other body part of a user. The multiple antenna modules may also allow for robust beam switching over the multiple antenna modules. In some instances, antenna modules may comprise dual polarized antenna elements, which may be utilized for transmissions in frequency range 2 (FR2) and beyond. An antenna module comprising a linear or planar array of antenna elements may be configured such that antenna elements on a horizontal polarization may be combined for one layer while antenna elements on a vertical polarization may be combined for a second layer. However, an evolving implementation, from an antenna module perspective, is for a UE to comprise an antenna module mounted on some edges or faces. The antenna elements may be dual polarized antenna elements where the combination of the horizontal polarized antenna elements on the first side are fixed with the horizontal polarized antenna elements on the second side, while the combination of the vertical polarized antenna elements on the first side are fixed with the vertical polarized antenna elements on the second side. However, such configuration may lead to a sub-optimal performance.

Aspects presented herein provide a configuration for dynamic polarization combination of antenna elements in a manner that allows for reduced complexity. For example, for antenna modules having two or more sides, the antenna module may be configured to dynamically combine antenna elements on different sides of the antenna module to enhance performance.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may comprise a combination component 198 configured to identify a first polarization of a first set of antenna elements on a first side of an antenna module having two or more sides; identify a second polarization of a second set of antenna elements on a second side of the antenna module; determine, for an antenna layer, a dynamic polarization combination between the first set of antenna elements having the first polarization with the second set of antenna elements having the second polarization; and communicate with a network entity via the antenna module based on the dynamic polarization combination.

Referring again to FIG. 1, in certain aspects, the base station 102 may comprise a configuration component 199 configured to obtain an antenna module capability indication indicating that a user equipment (UE) supports dynamic polarization combination or indicating a type of antenna module utilized at the UE; and configure, based on the antenna module capability indication, a reference signal configuration for the UE to conduct measurements of a plurality of reference signals at a first side of the antenna module and a second side of the antenna module.

Although the following description may be focused on 5G NR, the concepts described herein may be applicable to other similar areas, such as LTE, LTE-A, CDMA, GSM, and other wireless technologies.

Figure 2:
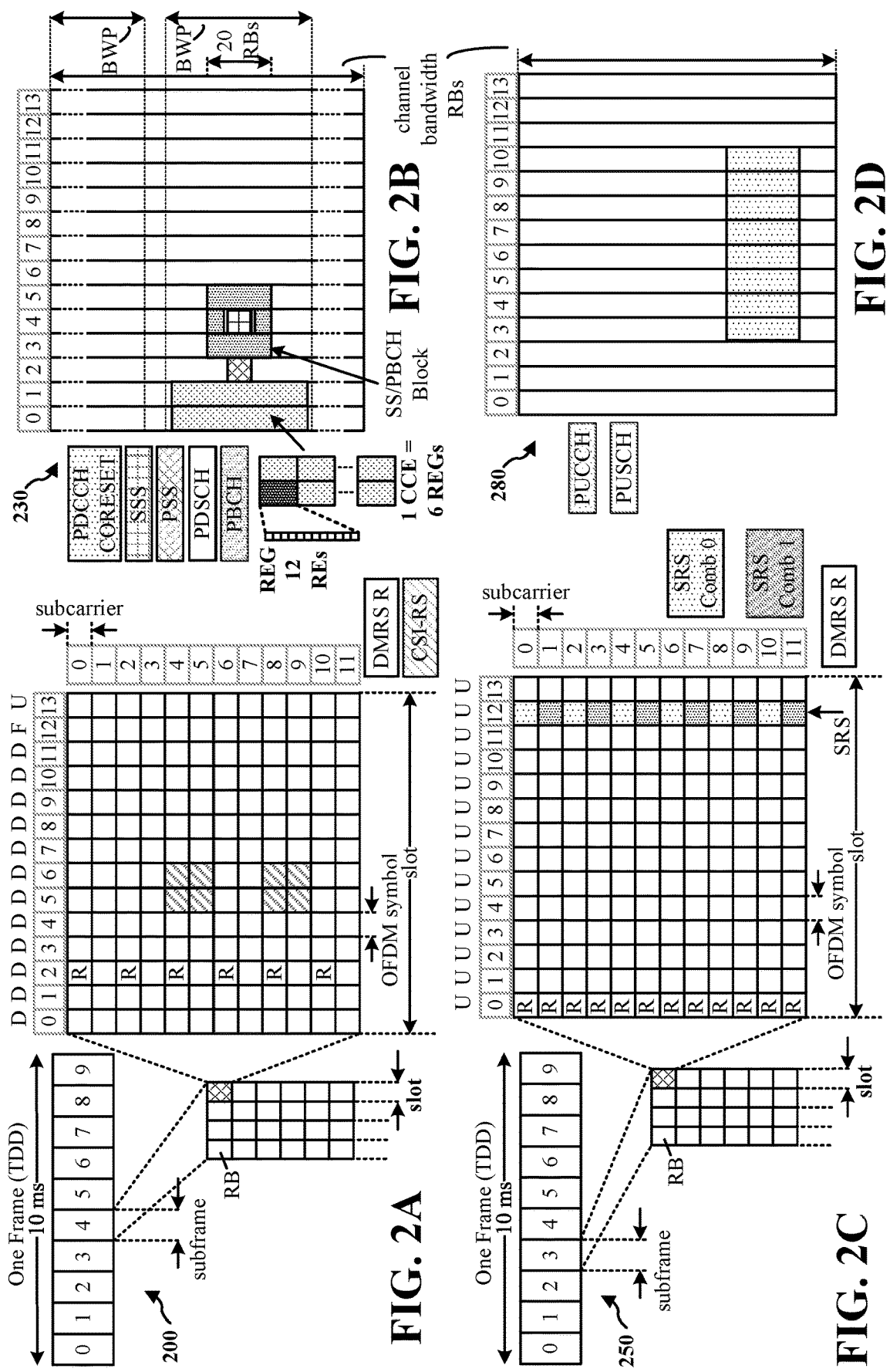
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| $\mu$ | SCS $\Delta f = 2^\mu \cdot 15$ [kHz] | Cyclic prefix |
| --- | --- | --- |
| 0 | 15 | Normal |
| 1 | 30 | Normal |
| 2 | 60 | Normal, Extended |
| 3 | 120 | Normal |

TABLE 1-continued

Numerology, SCS, and CP

| $\mu$ | SCS $\Delta f = 2^\mu \cdot 15$ [kHz] | Cyclic prefix |
| --- | --- | --- |
| 4 | 240 | Normal |
| 5 | 480 | Normal |
| 6 | 960 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu$*kHz, where $\mu$ is the numerology 0 to 4. As such, the numerology $\mu$=0 has a subcarrier spacing of 15 kHz and the numerology $\mu$=4 has a subcarrier spacing of 240 kHz. The symbol length/duration is inversely related to the subcarrier spacing. FIGS. 2A-2D provide an example of normal CP with 14 symbols per slot and numerology $\mu$=2 with 4 slots per subframe. The slot duration is 0.25 ms, the subcarrier spacing is kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIB s), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
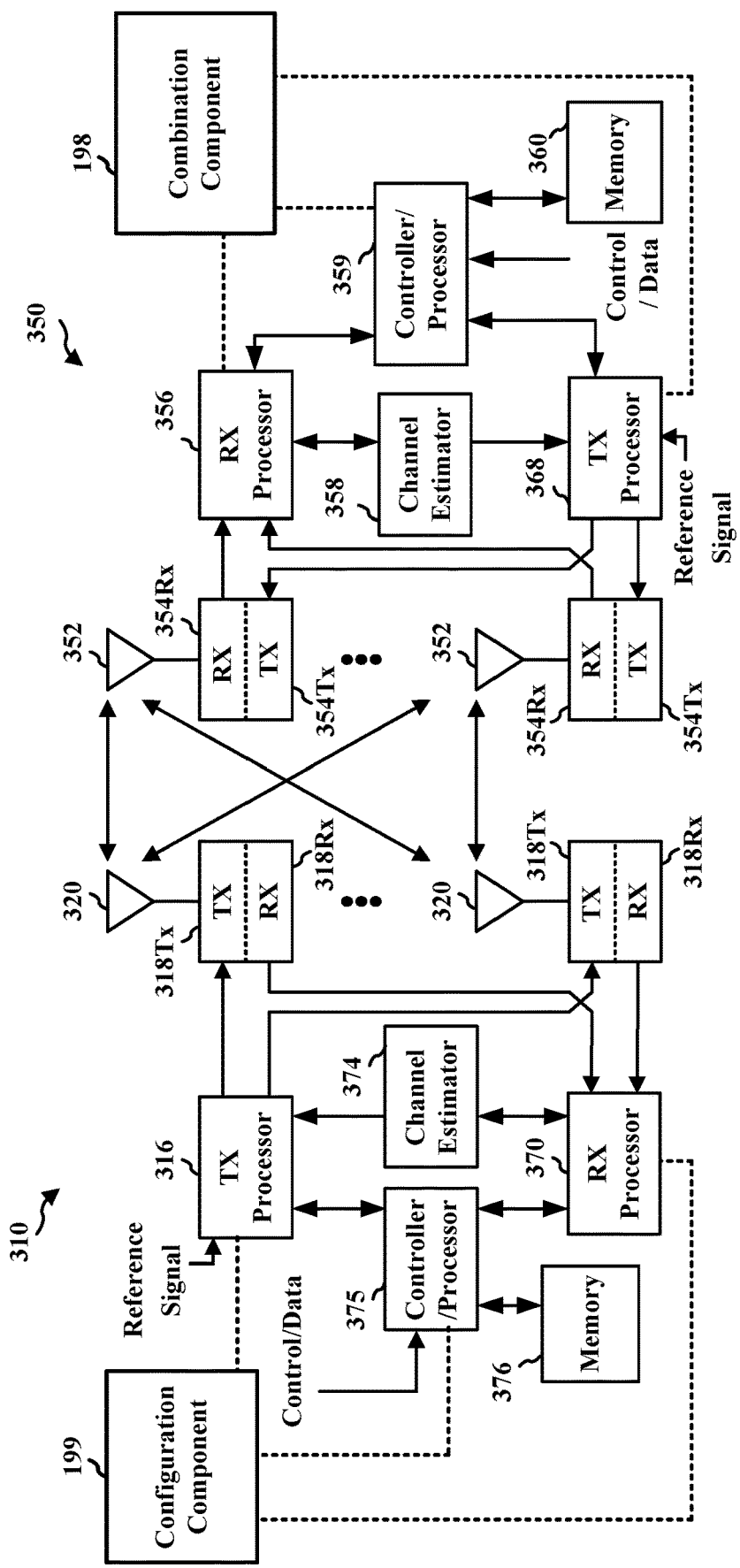
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/ processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the combination component 198 of FIG. 1.

At least one of the TX processor 316, the RX processor 370, and the controller/processor 375 may be configured to perform aspects in connection with the configuration component 199 of FIG. 1.

In wireless communications, such as but not limited to millimeter wave systems, multiple antennas may be used at the UE and at the base station. The multiple antennas at the UE and the base station may utilize beamforming to bridge the link budget within wireless communication systems. Multiple antenna modules/panels, within each antenna module, have a set of antenna elements that may be co-phased when beamforming is utilized, such as the beamformed signal 182 or 184 described in connection with FIG. 1. The use of multiple antenna modules may allow for the ability to meet spherical coverage requirements with or without signal blockage due to hand, head, or any other body part of a user. The multiple antenna modules may also allow for robust beam switching over the multiple antenna modules.

Figure 4:
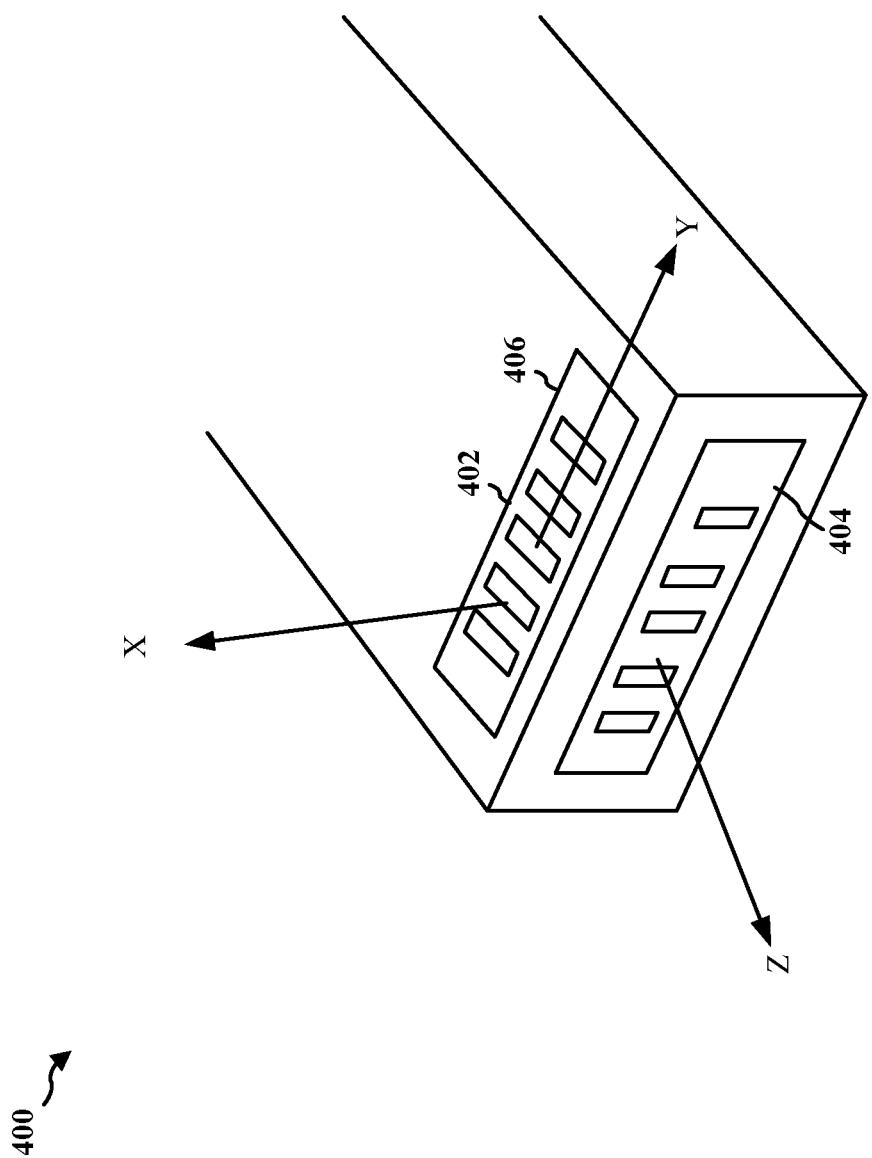
FIG. 4 is a diagram illustrating an example of an antenna module.

In some instances, antenna modules may comprise dual polarized antenna elements, which may be utilized for transmissions in FR2 and beyond. An antenna module comprising a linear or planar array of antenna elements may be configured such that antenna elements on a horizontal polarization may be combined for one layer while antenna elements on a vertical polarization may be combined for a second layer. However, an evolving implementation, from an antenna module perspective, is for a UE to comprise an antenna module mounted on some edges or faces, as shown for example diagram 400 in FIG. 4. The diagram 400 of FIG. 4 shows a UE having an antenna module 402 comprising a first side 404 and a second side 406, where a plurality of antenna elements on each side of the antenna module. The antenna elements may be dual polarized antenna elements where the combination of the horizontal polarized antenna elements on the first side 404 are fixed with the horizontal polarized antenna elements on the second side 406, while the combination of the vertical polarized antenna elements on the first side 404 are fixed with the vertical polarized antenna elements on the second side 406. However, such configuration may lead to a sub-optimal performance.

Aspects presented herein provide a configuration for dynamic polarization combination of antenna elements in a manner that allows for reduced complexity. For example, for antenna modules having two or more sides, the antenna module may be configured to dynamically combine antenna elements on different sides of the antenna module to enhance performance.

FIG. 5 is a diagram illustrating an example of an antenna module. The diagram 500 includes a UE comprising an antenna module 502 that comprises two sides. The antenna module 502 comprises a first side 504 and a second side 506. In the example of diagram 500, the antenna module 502 may be arranged to have an L-shaped configuration. The first side 504 and the second side 506 each may have a plurality of antenna elements (not shown), where the two sides may be at 90 degrees or substantially at 90 degrees with respect to each other. However, the antenna module is not intended to be limited to having two sides or an L-shape configuration, and may have more than two sides or be configured to have different shapes. For example, with reference to diagram 600 of FIG. 6, an antenna module 602 may comprise three sides, 604, 606, and 608.

Figure 7:
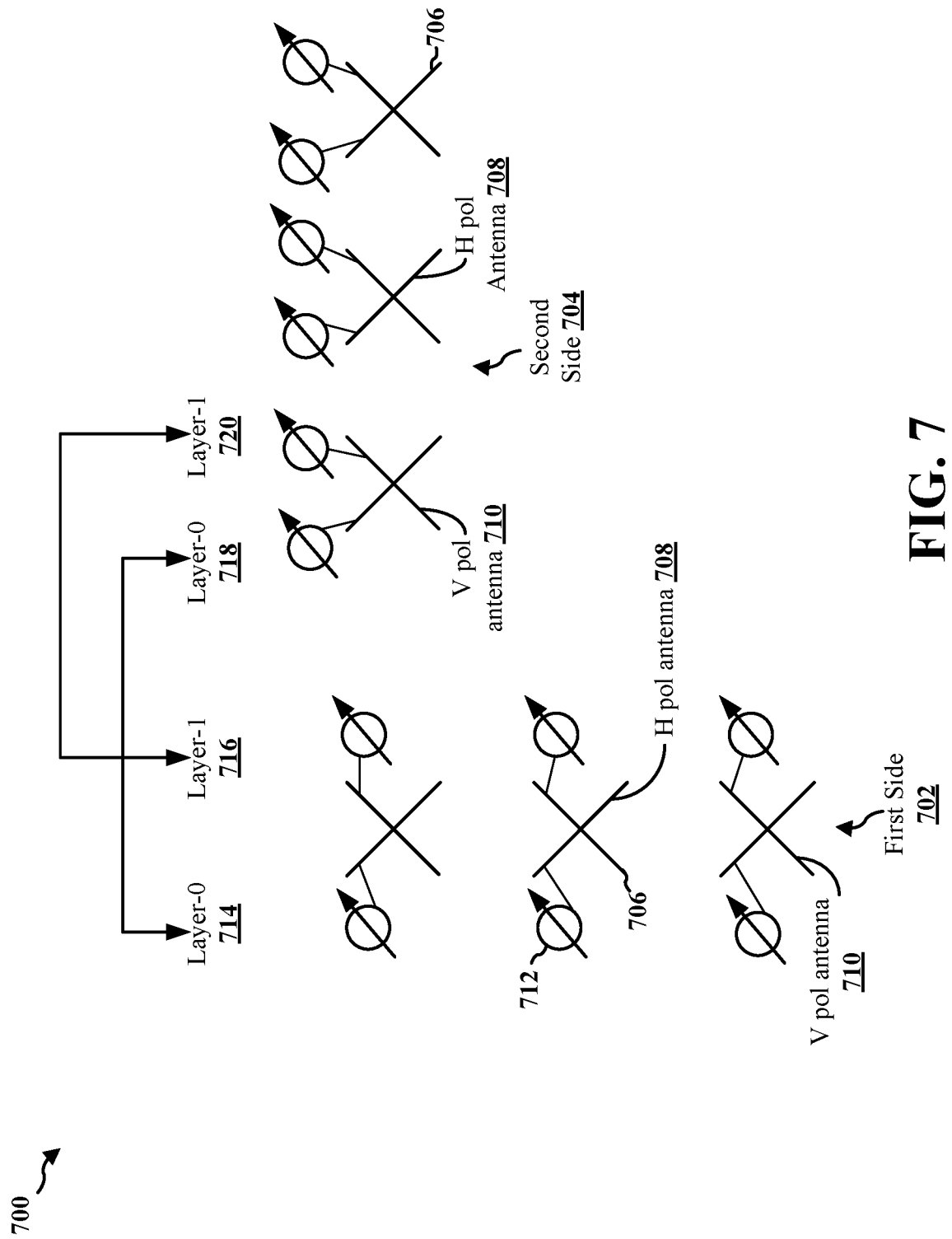
FIG. 7 is a diagram illustrating an example of polarization combining.

FIG. 7 is a diagram illustrating an example of polarization combining. The diagram 700 includes an antenna module comprised of multiple sides. The antenna module may comprise a plurality of antenna elements 706 on a first side 702 and a plurality of antenna elements 706 on a second side 704. Each of the plurality of antenna elements 706 may comprise a first polarization and a second polarization. The first polarization and the second polarization may be orthogonal to each other. In the example of FIG. 7, the plurality of antenna elements 706 may have a horizontal polarized antenna 708 and a vertical polarized antenna 710. However, the polarizations of the antenna elements may have many different polarizations, and the disclosure is not intended to be limited to the aspects disclosed herein. Each of the antenna elements may be coupled to a phase shifter 712.

In an antenna module having two or more sides, antenna elements on the first side may be combined with antenna elements on the second side. For example, horizontal polarized antennas 708 on the first side 702 may be combined with horizontal polarized antennas 708 or with vertical polarized antennas 710 on the second side 704. Similarly, vertical polarized antennas 710 on the first side 702 may be combined with vertical polarized antennas 710 or horizontal polarized antennas 708 on the second side 704. The right combination of antenna elements (e.g., horizontal polarized antennas 708) on the first side 702 with antenna elements (e.g., horizontal polarized antennas 708, vertical polarized antennas 710) on the other side (e.g., second side 704) may depend on an angle of interest of a dominant cluster in a channel and its angular spread, and polarization properties of the UE. RF circuitry for a planar or linear array antenna module is used with the antenna module having two or more sides may result in a fixed combination of antenna elements on the first side and the second side. For example, horizontal polarized antennas 708 on the first side 702 may be fixed or have a hard combination with horizontal polarized antennas 708 on the second side 704 for one layer (e.g., Layer-0 714, 718) and vertical polarized antennas 710 on the first side 702 may be fixed or have a hard combination with vertical polarized antennas 710 on the second side 704 for a second layer (e.g., Layer-1 716, 720).

In some instances, antenna modules having two or more sides, dynamic or unconstrained polarization combination may be utilized to enhance performance. For example, antennas having a first polarization on one side may be combined with antennas on the other side having either the first polarization or a second polarization. For example, horizontal polarized antennas on the first side may be combined with either the horizontal polarized antennas on the second side or the vertical polarized antennas on the second side. The combination of antennas on the first and second side may be based on an angle of interest of a dominant cluster in a channel, its angular spread, UE design, or the like. In some aspects, dynamic polarization combining with N dual polarized antennas (e.g., N=8) may put a massive strain on the RF circuitry as all the 2N antenna element feeds would be dynamically mapped to each port or layer, which may call for a 2N-to-1 demultiplexer. In such instances, since N may be large, such a dynamic mapping may increase the area of the demultiplexer and the power consumption, as well as feedline crossings which would lead to a complex chip design.

In some aspects, N antenna feeds may be mapped in RF/IF in a fixed manner and then combined in baseband for MRC gains. In such instances, antennas on one side may have a good gain while antennas on the other side may have good or poor gains. Combining all the antenna elements at the baseband may allow for the sets of antenna elements having good or stronger gains on either side to be constructively added for MRC gains.

In some aspects, per-antenna element amplitude control may be implemented at RF by weighing down antenna elements having poor or reduced gains. In such instances, a binary amplitude control (e.g., on or off) may be utilized as the amplitude control.

Figure 8:
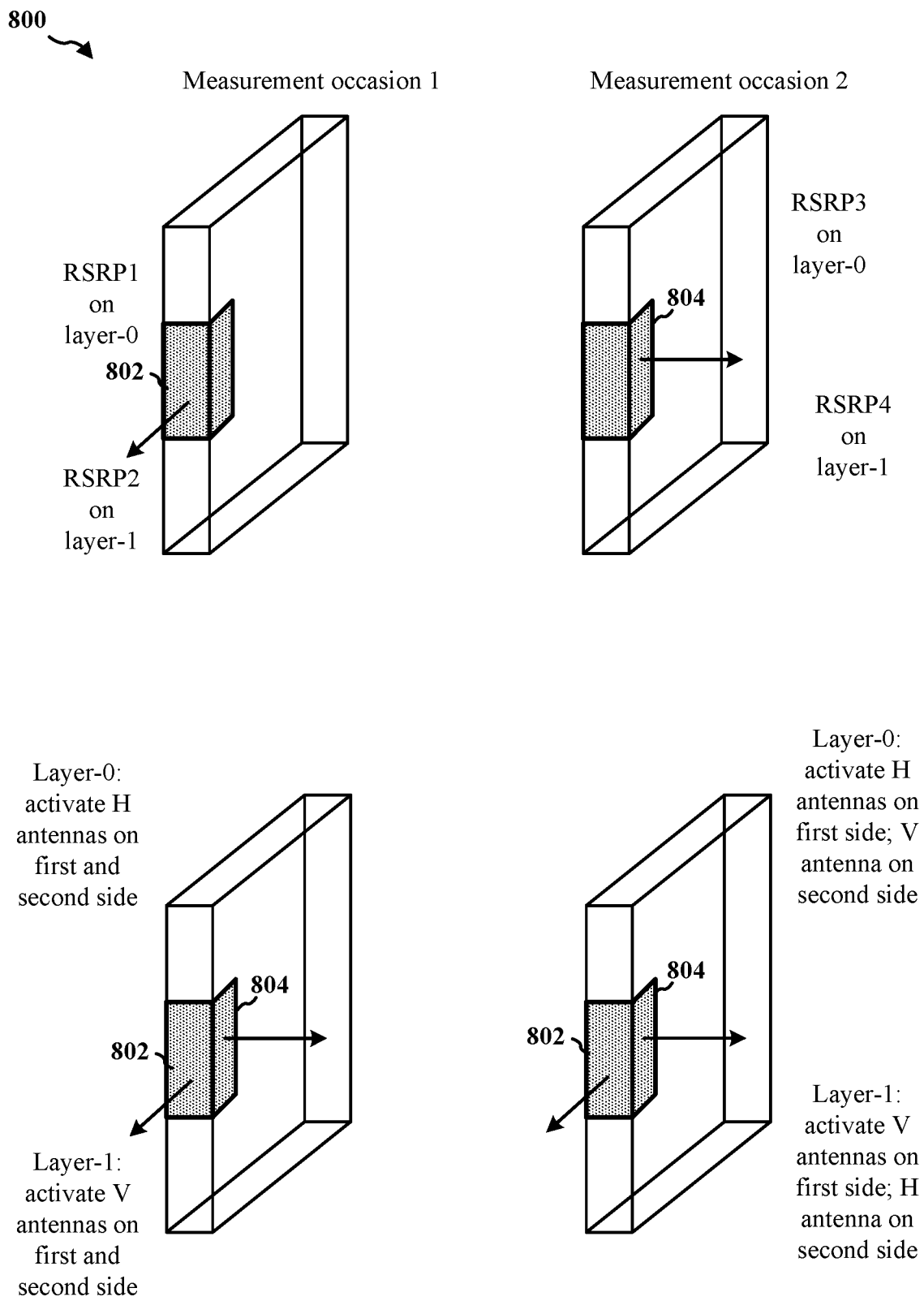
FIG. 8 is a diagram illustrating an example of an antenna module.

In some aspects, the UE may be configured to activate antenna elements on one side of the two or more sides, as shown for example in diagram 800 of FIG. 8. For example, a first set of antennas 802 (e.g., horizontal or vertical polarized antennas) on one layer and a second set of antennas (e.g., vertical or horizontal polarized antennas) on another layer with corresponding beam weights, where the UE measures the reference signal received power (RSRP) or an equivalent of the signal strength of reference signals from a base station. The UE may activate antenna elements 804 on the second side and also measure RSRP or signal strength. The UE may compare the RSRPs over the two measurement occasions such that the UE may determine whether antennas on one side may be combined with antennas on the second side. In some aspects, the UE may deactivate all the antenna elements on the second side. For example, if an antenna having a first polarization on the first side has a good RSRP and an antenna having a second polarization on the second side also has a good RSRP, the UE may combine all 2N antenna elements at the baseband by activating the antenna having the first polarization on the first side and the antenna having the second polarization on the second side, while the antenna elements on the first side having the second polarization and the antenna elements on the second side having the first polarization are deactivated. The antenna elements on the first side having the second polarization and the antenna elements on the second side having the first polarization may be deactivated due to having a poor or reduced RSRP in comparison to the other antenna elements. By activating/deactivating antenna elements dynamically, noise contributions of the deactivated antenna elements may be eliminated which may result in improved RSRP gains. The UE may implement binary amplitude control for a group of antenna elements as opposed for each individual antenna element. The example of FIG. 8 includes antennas having horizontal or vertical polarized antennas. However, the disclosure is not intended to be limited to the aspects disclosed herein. In some aspects, antennas having a polarization configuration other than horizontal or vertical may be used, such as but not limited to circular, elliptical, or the like.

In some aspects, for example as shown in FIG. 8, if RSRP1 and RSRP3 are good or have strong signal strength, antennas having a first polarization (e.g., horizontal polarization) on the first side and the second side may be combined in layer-0, and similarly, antennas having a second polarization (e.g., vertical polarization) on the first side and the second side may be combined in layer-1.

In some aspects, if RSRP1 is good or has a strong signal strength, and RSRP3 is poor or less than RSRP1, antennas having the first polarization on the first side and antennas having the second polarization on the second side may be combined in layer-0 while antennas having the second polarization on the first side and antennas having the first polarization on the second side may be combined in layer-1.

Figure 9:
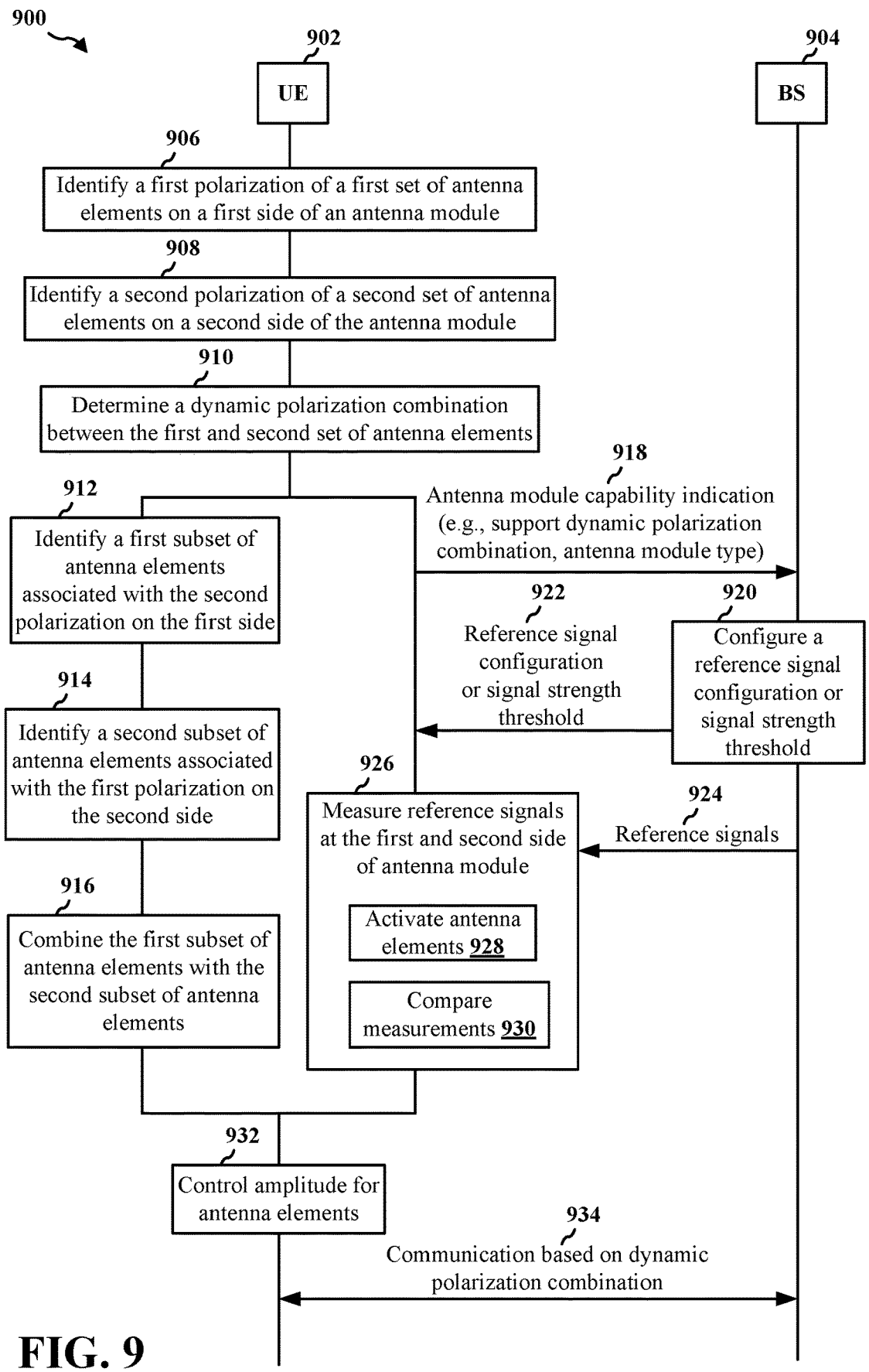
FIG. 9 is a call flow diagram of signaling between a UE and a base station.

FIG. 9 is a call flow diagram 900 of signaling between a UE 902 and a base station 904. The base station 904 may be configured to provide at least one cell. The UE 902 may be configured to communicate with the base station 904. For example, in the context of FIG. 1, the base station 904 may correspond to base station 102. Further, a UE 902 may correspond to at least UE 104. In another example, in the context of FIG. 3, the base station 904 may correspond to base station 310 and the UE 902 may correspond to UE 350.

At 906, the UE 902 may identify a first polarization of a first set of antenna elements of an antenna module. The UE 902 may identify the first polarization of the first set of antenna elements on a first side of the antenna module. The antenna module may have two or more sides. In some aspects, the antenna module may comprise two sides, such that the antenna module has an L-shaped design. In some aspects, the antenna module may comprise more than two sides, such that the disclosure is not intended to be limited to the examples provided herein. The antenna module having two or more sides may be based on any of the aspects described in connection with FIGS. 4-8.

At 908, the UE 902 may identify a second polarization of a second set of antenna elements of the antenna module. The UE 902 may identify the second polarization of the second set of antenna elements on a second side of the antenna module. In some aspects, the first side and the second side of the antenna module may be arranged to be perpendicular or substantially perpendicular (exceeding a certain angle threshold) to each other. For example, the first side and the second side of the antenna module may be adjacent each other on different surfaces within the UE such that the first side and the second side are arranged to be perpendicular or substantially perpendicular to each other. The UE identifying a polarization for the first and/or second set of antenna elements may be based on the aspect as described in connection with FIG. 7 or 8.

At 910, the UE 902 may determine, for an antenna layer, a dynamic polarization combination between the first set of antenna elements with the second set of antenna elements. The UE 902 may determine, for the antenna layer, the dynamic polarization combination between the first set of antenna elements having the first polarization with the second set of antenna elements having the second polarization. In some aspects, the dynamic polarization combination may be based on at least one of an angle of interest, an angular spread, or a UE design. In some aspects, the dynamic polarization combination may include combining across multiple antenna modules. The dynamic polarization combination of at least the first set of antenna elements on the first side of the antenna module with the second set of antenna elements on the second side of the antenna module may include a mapping of ports or layers between the first set of antenna elements on the first side of the antenna module and the second set of antenna elements on the second side of the antenna module that are then demultiplexed in different combinations of antenna elements. In some aspects, the dynamic polarization combination of at least the first set of antenna elements on the first side of the antenna module with the second set of antenna elements on the second side of the antenna module may be based on a fixed mapping of a number of antenna feeds between the first set of antenna elements on the first side of the antenna module and the second set of antenna elements on the second side of the antenna module. In some aspects, dynamic polarization combination may be achieved at an intermediate frequency (IF) in a superheterodyne architecture or at the baseband. The determination of the dynamic polarization combination may be based on any of the aspects as described in connection with FIG. 7 or 8.

At 912, the UE 902 may identify a first subset of antenna elements associated with the second polarization. The UE may identify the first subset of antenna elements associated with the second polarization on the first side of the antenna module, for example as described in connection with FIG. 7 or 8.

At 914, the UE 902 may identify a second subset of antenna elements associated with the first polarization. The UE 902 may identify the second subset of antenna elements associated with the first polarization on the second side of the antenna module. In some aspects, the first polarization and the second polarization are orthogonal to each other. For example, the first polarization may comprise a horizontal polarization, while the second polarization may comprise a vertical polarization, for example as described in connection with FIG. 7 or 8. Other possibilities include slant 45 degree polarization and slant minus 45 degree polarization, or left-handed elliptical (including circular) and right-handed elliptical (including circular) polarizations.

At 916, the UE 902 may combine the first subset of antenna elements on the first side of the antenna module with the second subset of antenna elements on the second side of the antenna module. The UE 902 may combine the first subset of antenna elements on the first side of the antenna module having the second polarization with the second subset of antenna elements on the second side of the antenna module having a polarization opposite the second set of antenna elements on the second side of the antenna module combined with the first set of antenna elements on the first side of the antenna module, for example as described in connection with FIG. 7 or 8.

At 918, the UE 902 may transmit an antenna module capability indication. The UE 902 may transmit the antenna module capability indication to the base station 904. The base station 904 may receive the antenna module capability indication from the UE 902. The antenna module capability indication may indicate at least one of UE support for the dynamic polarization combination or may indicate a type of antenna module used by the UE. For example, the antenna module capability indication may indicate that the UE supports dynamic polarization combination. In another example, the antenna module capability indication may indicate the type of antenna module utilized at the UE, such as an antenna module having at least two or more sides with a corresponding set of antenna elements on each of the at least two or more sides.

At 920, the base station 904 may configure a reference signal configuration or a signal strength threshold. In some aspects, the base station 904 may configure a reference signal configuration for the UE 902. The base station 904 may configure, based on the antenna module capability indication, the reference signal configuration for the UE to conduct measurements of a plurality of reference signals at a first side of the antenna module and a second side of the antenna module. In some aspects, the base station 904 may configure at least one signal strength threshold for the dynamic polarization combination. The base station 904 may configure, based on the antenna module capability indication, the at least one signal strength threshold for the dynamic polarization combination of a first set of antenna elements on the first side of the antenna module with a second set of antenna elements on the second side of the antenna module.

At 922, the base station 904 may transmit the reference signal configuration or the signal strength threshold to the UE 902. The UE 902 may receive the reference signal configuration or the signal strength threshold from the base station 904. In some aspects, the UE 902 may receive the reference signal configuration. The reference signal configuration may configure the UE 902 to conduct measurements of the plurality of reference signals at the first side of the antenna module and the second side of the antenna module. In some aspects, the UE 902 may receive the at least one signal strength threshold. The at least one signal strength threshold may provide a signal strength threshold for the dynamic polarization combination of the first set of antenna elements on the first side of the antenna module with a set of antenna elements on the second side of the antenna module.

At 926, the UE 902 may measure a plurality of reference signals at the first and second side of the antenna module. The UE may measure the plurality of reference signals 924 transmitted by the base station 904. The UE may measure the plurality of reference signals 924 at the first side of the antenna module and at the second side of the antenna module. The UE may determine the dynamic polarization combination based on measurements of the plurality of reference signals at the first side of the antenna module and the second side of the antenna module, for example as described in connection with FIG. 7 or 8.

In some aspects, to measure the plurality of reference signals at the first side and the second side of the antenna module, the UE, at 928, may activate antenna elements on the antenna module, for example as described in connection with FIG. 7 or 8. For example, the UE may activate the antenna elements on the first side of the antenna module. The UE may activate the antenna elements on the first side of the antenna module to conduct a measurement of the plurality of reference signals for a first measurement occasion. In another example, the UE may activate antenna elements on the second side of the antenna module. The UE may activate the antenna elements on the second side of the antenna module to conduct the measurement of the plurality of reference signals for a second measurement occasion.

In some aspects, to measure the plurality of reference signals at the first side and the second side of the antenna module, the UE, at 930, may compare measurements of the plurality of reference signals, for example as described in connection with FIG. 7 or 8. The UE may compare the measurements of the plurality of reference signals over the first measurement occasion and the second measurement occasion to determine the dynamic polarization combination. In some aspects, the antenna elements on the second side of the antenna module that are not combined with the first set of antenna elements on the first side of the antenna module may be deactivated or may not be used for transmissions and/or receptions.

At 932, the UE 902 may control an amplitude for each antenna element. To control the amplitude for each antenna element, the UE may assign a weight value to one or more antenna elements, for example as described in connection with FIG. 7 or 8. For example, the UE may assign a weight value to one or more antenna elements having a lower gain than other antenna elements. In instances where a per-antenna element amplitude control is implemented at RF, the UE may weigh down or assign a weight value to antenna elements that have poor or reduced gains in comparison to the remaining elements. In some aspects, the weight value may comprise a binary amplitude control (e.g., on or off).

At 934, the UE 902 may communicate with base station 904 via the antenna module. The UE 902 may communicate with the base station via the antenna module based on the dynamic polarization combination.

Figure 10:
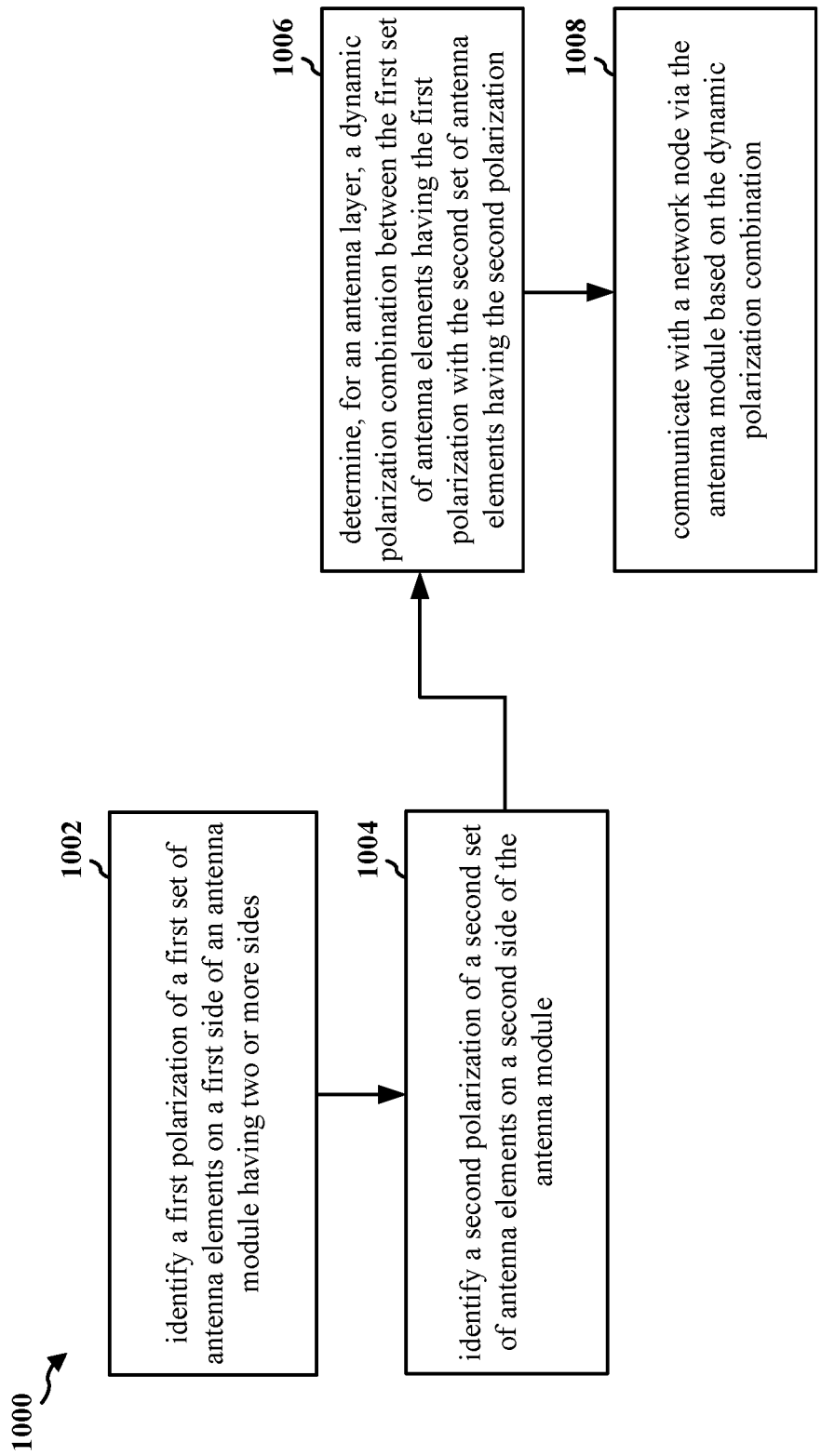
FIG. 10 is a flowchart of a method of wireless communication.

FIG. 10 is a flowchart 1000 of a method of wireless communication. The method may be performed by a UE (e.g., the UE 104; the apparatus 1204). One or more of the illustrated operations may be omitted, transposed, or contemporaneous. The method may allow for dynamic polarization combining of antenna elements of an antenna module having two or more sides.

At 1002, the UE may identify a first polarization of a first set of antenna elements of an antenna module. For example, 1002 may be performed by combination component 198 of apparatus 1204. The UE may identify the first polarization of the first set of antenna elements on a first side of the antenna module. The antenna module may have two or more sides. In some aspects, the antenna module may comprise two sides, such that the antenna module has an L-shaped design. In some aspects, the antenna module may comprise more than two sides, such that the disclosure is not intended to be limited to the examples provided herein. The antenna module having two or more sides may be based on any of the aspects described in connection with FIGS. 4-8.

At 1004, the UE may identify a second polarization of a second set of antenna elements of the antenna module. For example, 1004 may be performed by combination component 198 of apparatus 1204. The UE may identify the second polarization of the second set of antenna elements on a second side of the antenna module. In some aspects, the first side and the second side of the antenna module may be arranged to be perpendicular or substantially perpendicular to each other. For example, the first side and the second side of the antenna module may be adjacent each other on different surfaces within the UE such that the first side and the second side are arranged to be perpendicular or substantially perpendicular to each other. The UE identifying a polarization for the first and/or second set of antenna elements may be based on the aspect as described in connection with FIG. 7 or 8.

At 1006, the UE may determine, for an antenna layer, a dynamic polarization combination between the first set of antenna elements with the second set of antenna elements. For example, 1006 may be performed by combination component 198 of apparatus 1204. The UE may determine, for the antenna layer, the dynamic polarization combination between the first set of antenna elements having the first polarization with the second set of antenna elements having the second polarization. In some aspects, the dynamic polarization combination may be based on at least one of an angle of interest, an angular spread, or a UE design. In some aspects, the dynamic polarization combination may include combining across multiple antenna modules. The dynamic polarization combination of at least the first set of antenna elements on the first side of the antenna module with the second set of antenna elements on the second side of the antenna module may include a mapping of ports or layers between the first set of antenna elements on the first side of the antenna module and the second set of antenna elements on the second side of the antenna module that are then demultiplexed in different combinations of antenna elements. In some aspects, the dynamic polarization combination of at least the first set of antenna elements on the first side of the antenna module with the second set of antenna elements on the second side of the antenna module may be based on a fixed mapping of a number of antenna feeds between the first set of antenna elements on the first side of the antenna module and the second set of antenna elements on the second side of the antenna module. In some aspects, dynamic polarization combination may be achieved at an IF in a superheterodyne architecture or at the baseband. The determination of the dynamic polarization combination may be based on any of the aspects as described in connection with FIG. 7 or 8.

At 1008, the UE may communicate with a network entity via the antenna module. For example, 1008 may be performed by combination component 198 of apparatus 1204. The UE may communicate with the network entity via the antenna module based on the dynamic polarization combination.

Figure 11:
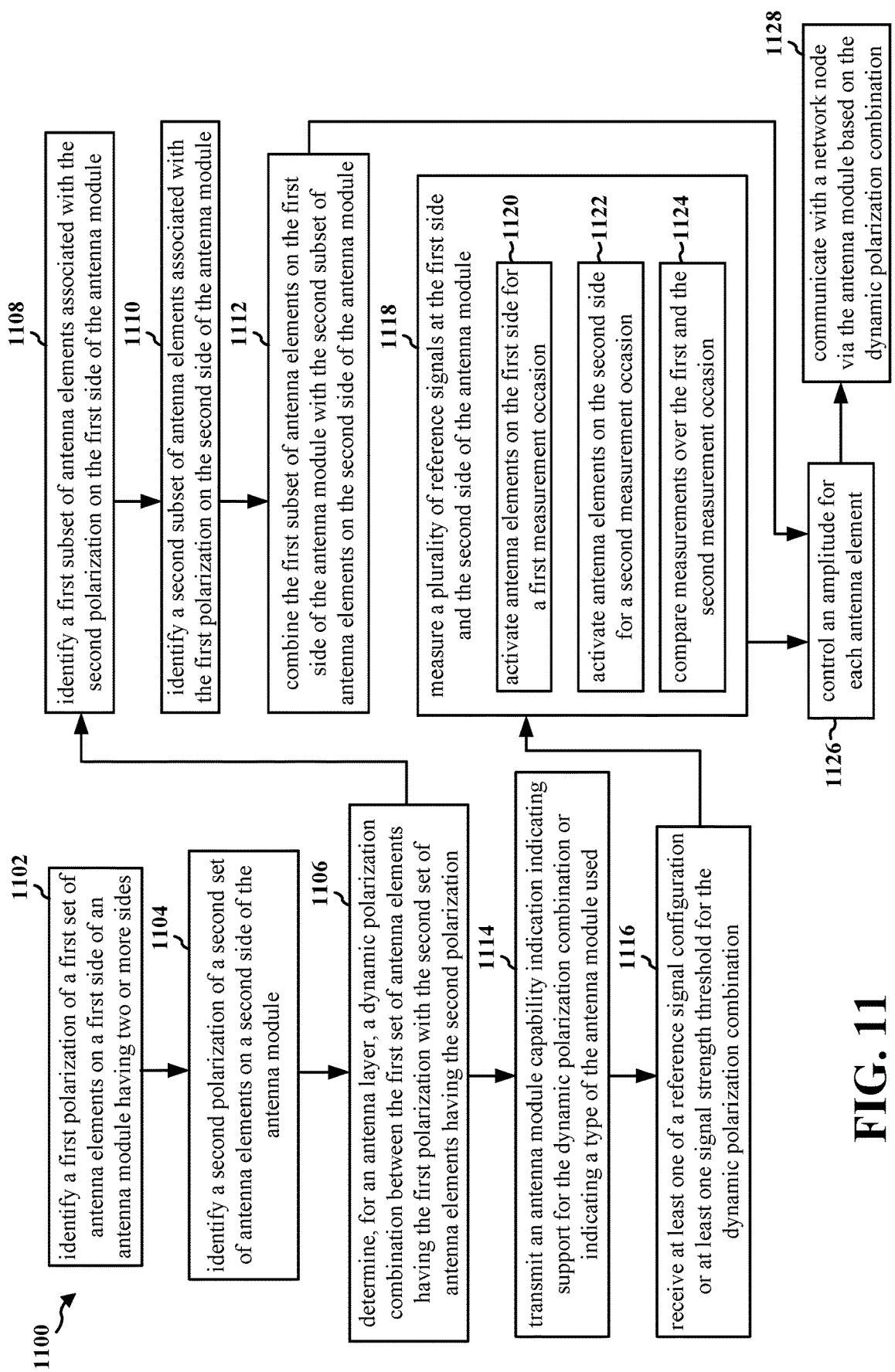
FIG. 11 is a flowchart of a method of wireless communication.

FIG. 11 is a flowchart 1100 of a method of wireless communication. The method may be performed by a UE (e.g., the UE 104; the apparatus 1204). One or more of the illustrated operations may be omitted, transposed, or contemporaneous. The method may allow for dynamic polarization combining of antenna elements of an antenna module having two or more sides.

At 1102, the UE may identify a first polarization of a first set of antenna elements of an antenna module. For example, 1102 may be performed by combination component 198 of apparatus 1204. The UE may identify the first polarization of the first set of antenna elements on a first side of the antenna module. The antenna module may have two or more sides. In some aspects, the antenna module may comprise two sides, such that the antenna module has an L-shaped design. In some aspects, the antenna module may comprise more than two sides, such that the disclosure is not intended to be limited to the examples provided herein. The antenna module having two or more sides may be based on any of the aspects described in connection with FIGS. 4-8.

At 1104, the UE may identify a second polarization of a second set of antenna elements of the antenna module. For example, 1104 may be performed by combination component 198 of apparatus 1204. The UE may identify the second polarization of the second set of antenna elements on a second side of the antenna module. In some aspects, the first side and the second side of the antenna module may be arranged to be perpendicular or substantially perpendicular to each other. For example, the first side and the second side of the antenna module may be adjacent each other on different surfaces within the UE such that the first side and the second side are arranged to be perpendicular or substantially perpendicular to each other. The UE identifying a polarization for the first and/or second set of antenna elements may be based on the aspect as described in connection with FIG. 7 or 8.

At 1106, the UE may determine, for an antenna layer, a dynamic polarization combination between the first set of antenna elements with the second set of antenna elements. For example, 1106 may be performed by combination component 198 of apparatus 1204. The UE may determine, for the antenna layer, the dynamic polarization combination between the first set of antenna elements having the first polarization with the second set of antenna elements having the second polarization. In some aspects, the dynamic polarization combination may be based on at least one of an angle of interest, an angular spread, or a UE design. In some aspects, the dynamic polarization combination may include combining across multiple antenna modules. The dynamic polarization combination of at least the first set of antenna elements on the first side of the antenna module with the second set of antenna elements on the second side of the antenna module may include a mapping of ports or layers between the first set of antenna elements on the first side of the antenna module and the second set of antenna elements on the second side of the antenna module that are then demultiplexed in different combinations of antenna elements. In some aspects, the dynamic polarization combination of at least the first set of antenna elements on the first side of the antenna module with the second set of antenna elements on the second side of the antenna module may be based on a fixed mapping of a number of antenna feeds between the first set of antenna elements on the first side of the antenna module and the second set of antenna elements on the second side of the antenna module. In some aspects, dynamic polarization combination may be achieved at an intermediate frequency (IF) in a superheterodyne architecture or at the baseband. The UE identifying a polarization for the first and/or second set of antenna elements may be based on the aspect as described in connection with FIG. 7 or 8.

At 1108, the UE may identify a first subset of antenna elements associated with the second polarization. For example, 1108 may be performed by combination component 198 of apparatus 1204. The UE may identify the first subset of antenna elements associated with the second polarization on the first side of the antenna module, for example as described in connection with FIG. 7 or 8.

At 1110, the UE may identify a second subset of antenna elements associated with the first polarization. For example, 1110 may be performed by combination component 198 of apparatus 1204. The UE may identify the second subset of antenna elements associated with the first polarization on the second side of the antenna module. In some aspects, the first polarization and the second polarization are orthogonal to each other. For example, the first polarization may comprise a horizontal polarization, while the second polarization may comprise a vertical polarization, for example as described in connection with FIG. 7 or 8.

At 1112, the UE may combine the first subset of antenna elements on the first side of the antenna module with the second subset of antenna elements on the second side of the antenna module. For example, 1112 may be performed by combination component 198 of apparatus 1204. The UE may combine the first subset of antenna elements on the first side of the antenna module having the second polarization with the second subset of antenna elements on the second side of the antenna module having a polarization opposite the second set of antenna elements on the second side of the antenna module combined with the first set of antenna elements on the first side of the antenna module, for example as described in connection with FIG. 7 or 8.

At 1114, the UE may transmit an antenna module capability indication. For example, 1114 may be performed by combination component 198 of apparatus 1204. The UE may transmit the antenna module capability indication to at least one network entity. The antenna module capability indication may indicate at least one of support for the dynamic polarization combination or may indicate a type of antenna module used. For example, the antenna module capability indication may indicate that the UE supports dynamic polarization combination. In another example, the antenna module capability indication may indicate the type of antenna module utilized at the UE, such as an antenna module having at least two or more sides with a corresponding set of antenna elements on each of the at least two or more sides.

At 1116, the UE may receive at least one of a reference signal configuration or at least one signal strength threshold. For example, 1116 may be performed by combination component 198 of apparatus 1204. In some aspects, the UE may receive the reference signal configuration. The reference signal configuration may configure the UE to conduct measurements of the plurality of reference signals at the first side of the antenna module and the second side of the antenna module. In some aspects, the UE may receive the at least one signal strength threshold. The at least one signal strength threshold may provide a signal strength threshold for the dynamic polarization combination of the first set of antenna elements on the first side of the antenna module with a set of antenna elements on the second side of the antenna module.

At 1118, the UE may measure a plurality of reference signals. For example, 1118 may be performed by combination component 198 of apparatus 1204. The UE may measure the plurality of reference signals from the network entity. The UE may measure the plurality of reference signals at the first side of the antenna module and at the second side of the antenna module. The UE may determine the dynamic polarization combination based on measurements of the plurality of reference signals at the first side of the antenna module and the second side of the antenna module, for example as described in connection with FIG. 7 or 8.

In some aspects, to measure the plurality of reference signals at the first side and the second side of the antenna module, the UE, at 1120, may activate antenna elements on the first side of the antenna module, for example as described in connection with FIG. 7 or 8. For example, 1120 may be performed by combination component 198 of apparatus 1204. The UE may activate the antenna elements on the first side of the antenna module to conduct a measurement of the plurality of reference signals for a first measurement occasion.

In some aspects, to measure the plurality of reference signals at the first side and the second side of the antenna module, the UE, at 1122, may activate antenna elements on the second side of the antenna module, for example as described in connection with FIG. 7 or 8. For example, 1122 may be performed by combination component 198 of apparatus 1204. The UE may activate the antenna elements on the second side of the antenna module to conduct the measurement of the plurality of reference signals for a second measurement occasion.

In some aspects, to measure the plurality of reference signals at the first side and the second side of the antenna module, the UE, at 1124, may compare measurements of the plurality of reference signals, for example as described in connection with FIG. 7 or 8. For example, 1124 may be performed by combination component 198 of apparatus 1204. The UE may compare the measurements of the plurality of reference signals over the first measurement occasion and the second measurement occasion to determine the dynamic polarization combination. In some aspects, the antenna elements on the second side of the antenna module that are not combined with the first set of antenna elements on the first side of the antenna module may be deactivated or may not be used for transmissions and/or receptions.

At 1126, the UE may control an amplitude for each antenna element. For example, 1126 may be performed by combination component 198 of apparatus 1204. To control the amplitude for each antenna element, the UE may assign a weight value to one or more antenna elements, for example as described in connection with FIG. 7 or 8. For example, the UE may assign a weight value to one or more antenna elements having a lower gain than other antenna elements. In instances where a per-antenna element amplitude control is implemented at RF, the UE may weigh down or assign a weight value to antenna elements that have poor or reduced gains in comparison to the remaining elements. In some aspects, the weight value may comprise a binary amplitude control (e.g., on or off).

At 1128, the UE may communicate with a network entity via the antenna module. For example, 1128 may be performed by combination component 198 of apparatus 1204. The UE may communicate with the network entity via the antenna module based on the dynamic polarization combination.

Figure 12:
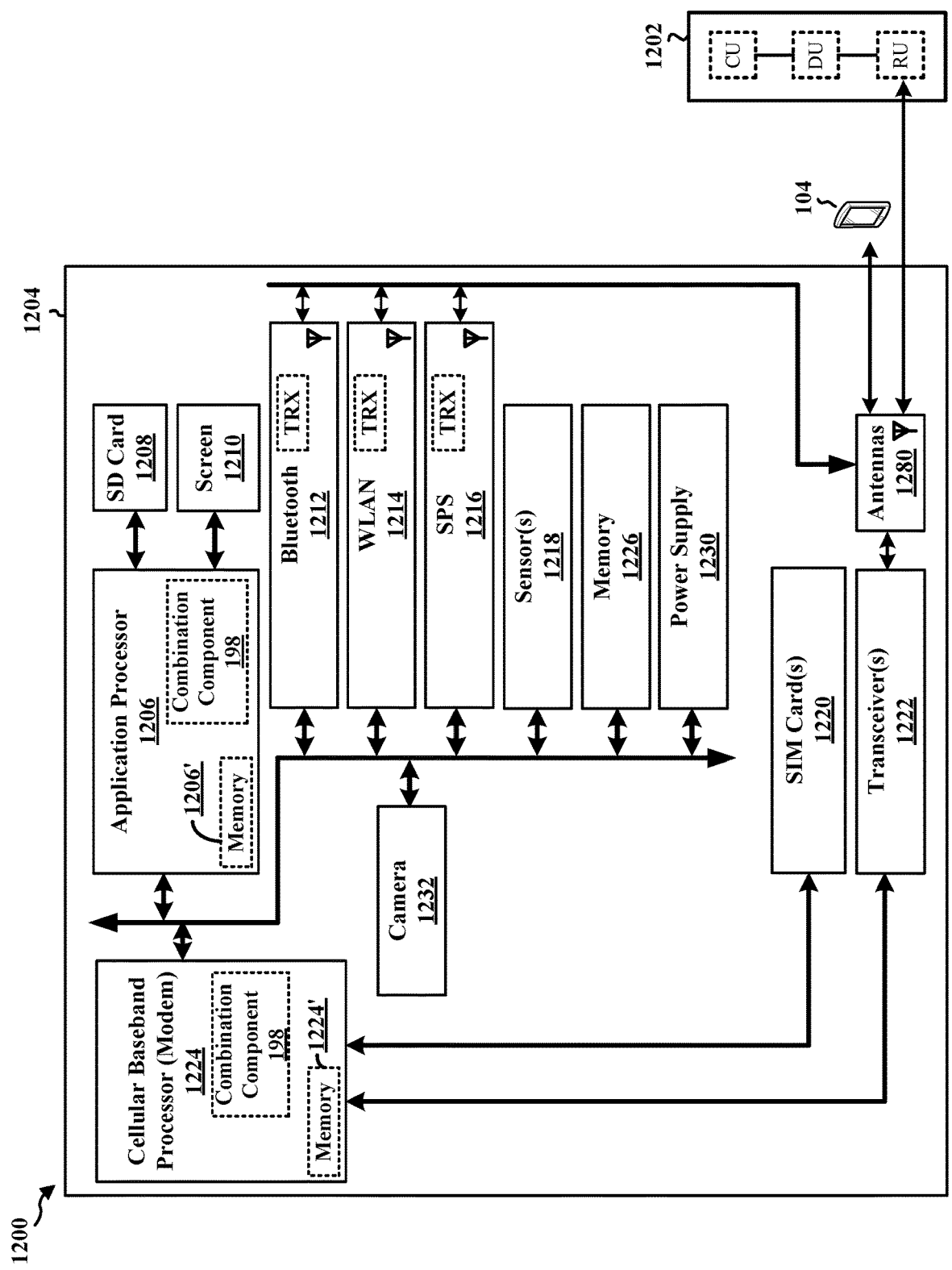
FIG. 12 is a diagram illustrating an example of a hardware implementation for an example apparatus and/or network entity.

FIG. 12 is a diagram 1200 illustrating an example of a hardware implementation for an apparatus 1204. The apparatus 1204 may be a UE, a component of a UE, or may implement UE functionality. In some aspects, the apparatus 1204 may include a cellular baseband processor 1224 (also referred to as a modem) coupled to one or more transceivers 1222 (e.g., cellular RF transceiver). The cellular baseband processor 1224 may include on-chip memory 1224'. In some aspects, the apparatus 1204 may further include one or more subscriber identity modules (SIM) cards 1220 and an application processor 1206 coupled to a secure digital (SD) card 1208 and a screen 1210. The application processor 1206 may include on-chip memory 1206'. In some aspects, the apparatus 1204 may further include a Bluetooth module 1212, a WLAN module 1214, an SPS module 1216 (e.g., GNSS module), one or more sensor modules 1218 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1226, a power supply 1230, and/or a camera 1232. The Bluetooth module 1212, the WLAN module 1214, and the SPS module 1216 may include an on-chip transceiver (TRX) (or in some cases, just a receiver (RX)). The Bluetooth module 1212, the WLAN module 1214, and the SPS module 1216 may include their own dedicated antennas and/or utilize the antennas 1280 for communication. The cellular baseband processor 1224 communicates through the transceiver(s) 1222 via one or more antennas 1280 with the UE 104 and/or with an RU associated with a network entity 1202. The cellular baseband processor 1224 and the application processor 1206 may each include a computer-readable medium/memory 1224', 1206', respectively. The additional memory modules 1226 may also be considered a computer-readable medium/memory. Each computer-readable medium/memory 1224', 1206', 1226 may be non-transitory. The cellular baseband processor 1224 and the application processor 1206 are each responsible for general processing, including the execution of software stored on the computer-readable medium/memory. The software, when executed by the cellular baseband processor 1224/application processor 1206, causes the cellular baseband processor 1224/application processor 1206 to perform the various functions described supra. The computer-readable medium/memory may also be used for storing data that is manipulated by the cellular baseband processor 1224/application processor 1206 when executing software. The cellular baseband processor 1224/application processor 1206 may be a component of the UE 350 and may include the memory 360 and/or at least one of the TX processor 368, the RX processor 356, and the controller/processor 359. In one configuration, the apparatus 1204 may be a processor chip (modem and/or application) and include just the cellular baseband processor 1224 and/or the application processor 1206, and in another configuration, the apparatus 1204 may be the entire UE (e.g., see 350 of FIG. 3) and include the additional modules of the apparatus 1204.

As discussed supra, the component 198 is configured to identify a first polarization of a first set of antenna elements on a first side of an antenna module having two or more sides; identify a second polarization of a second set of antenna elements on a second side of the antenna module; determine, for an antenna layer, a dynamic polarization combination between the first set of antenna elements having the first polarization with the second set of antenna elements having the second polarization; and communicate with a network entity via the antenna module based on the dynamic polarization combination. The component 198 may be within the cellular baseband processor 1224, the application processor 1206, or both the cellular baseband processor 1224 and the application processor 1206. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1204 may include a variety of components configured for various functions. In one configuration, the apparatus 1204, and in particular the cellular baseband processor 1224 and/or the application processor 1206, includes means for identifying a first polarization of a first set of antenna elements on a first side of an antenna module having two or more sides. The apparatus includes means for identifying a second polarization of a second set of antenna elements on a second side of the antenna module. The apparatus includes means for determining, for an antenna layer, a dynamic polarization combination between the first set of antenna elements having the first polarization with the second set of antenna elements having the second polarization. The apparatus includes means for communicating with a network entity via the antenna module based on the dynamic polarization combination. The apparatus further includes means for identifying a first subset of antenna elements associated with the second polarization on the first side of the antenna module. The apparatus further includes means for identifying a second subset of antenna elements associated with the first polarization on the second side of the antenna module. The apparatus further includes means for combining the first subset of antenna elements on the first side of the antenna module having the second polarization with the second subset of antenna elements on the second side of the antenna module having a polarization opposite the second set of antenna elements on the second side of the antenna module combined with the first set of antenna elements on the first side of the antenna module. The apparatus further includes means for measuring a plurality of reference signals at the first side of the antenna module and at the second side of the antenna module. The UE determines the dynamic polarization combination based on measurements of the plurality of reference signals at the first side of the antenna module and the second side of the antenna module. The apparatus further includes means for activating antenna elements on the first side to conduct a measurement of the plurality of reference signals for a first measurement occasion. The apparatus further includes means for activating antenna elements on the second side to conduct the measurement of the plurality of reference signals for a second measurement occasion. The apparatus further includes means for comparing measurements of the plurality of reference signals over the first measurement occasion and the second measurement occasion to determine the dynamic polarization combination. The apparatus further includes means for transmitting an antenna module capability indication indicating support for the dynamic polarization combination or indicating a type of the antenna module used. The apparatus further includes means for receiving a reference signal configuration to conduct measurements of the plurality of reference signals at the first side of the antenna module and the second side of the antenna module. The apparatus further includes means for receiving at least one signal strength threshold for the dynamic polarization combination of the first set of antenna elements on the first side of the antenna module with a set of antenna elements on the second side of the antenna module. The apparatus further includes means for controlling an amplitude for each antenna element, including assigning a weight value to one or more antenna elements having a lower gain than other antenna elements. The means may be the component 198 of the apparatus 1204 configured to perform the functions recited by the means. As described supra, the apparatus 1204 may include the TX processor 368, the RX processor 356, and the controller/processor 359. As such, in one configuration, the means may be the TX processor 368, the RX processor 356, and/or the controller/processor 359 configured to perform the functions recited by the means.

Figure 13:
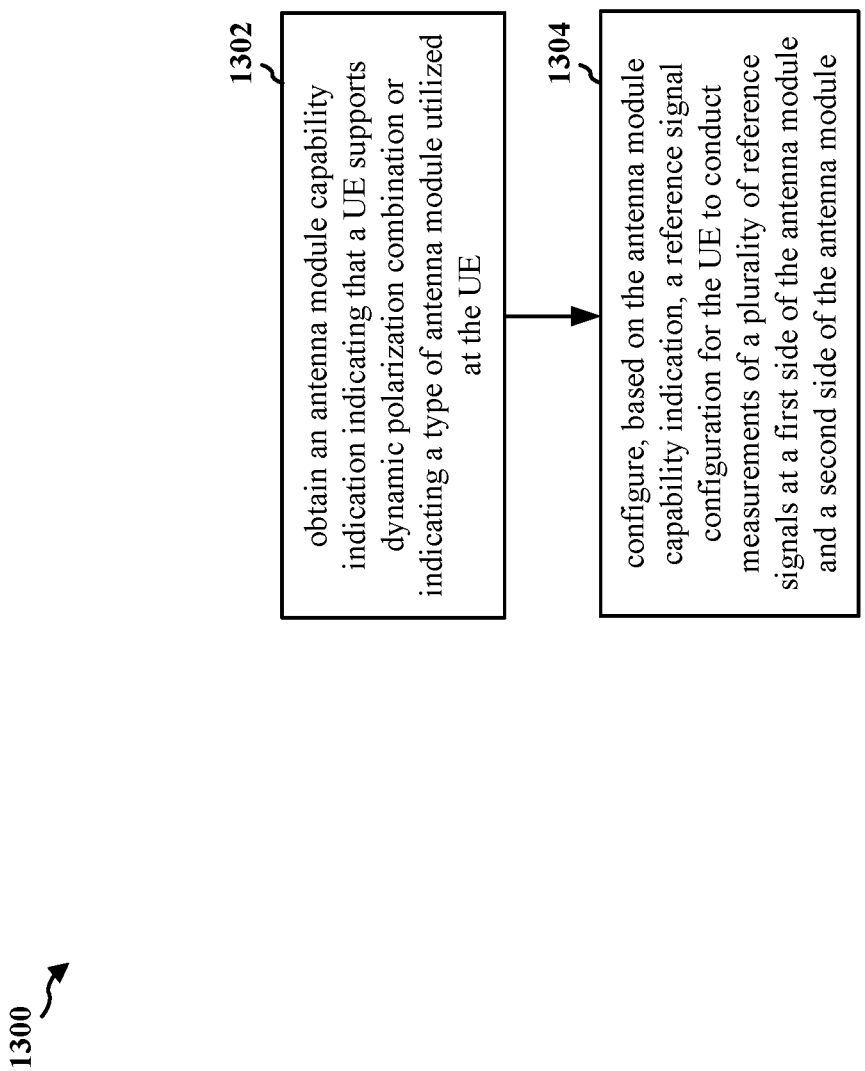
FIG. 13 is a flowchart of a method of wireless communication.

FIG. 13 is a flowchart 1300 of a method of wireless communication. The method may be performed by a base station (e.g., the base station 102; the network entity 1502. One or more of the illustrated operations may be omitted, transposed, or contemporaneous. The method may configure a UE to perform dynamic polarization combining of antenna elements of an antenna module having two or more sides.

At 1302, the network entity may obtain an antenna module capability indication. For example, 1302 may be performed by configuration component 199 of network entity 1502. The network entity may obtain the antenna module capability indication from a UE. The antenna module capability indication may indicate that the UE supports dynamic polarization combination. The antenna module capability indication may indicate a type of antenna module utilized at the UE. In some aspects, the type of the antenna module used indicated in the antenna module capability indication may be an antenna module that comprises two or more sides. In some aspects, the antenna module comprises two sides such that the antenna module has an L-shaped design.

At 1304, the network entity may configure a reference signal configuration for the UE. For example, 1304 may be performed by configuration component 199 of network entity 1502. The network entity may configure, based on the antenna module capability indication, the reference signal configuration for the UE to conduct measurements of a plurality of reference signals at a first side of the antenna module and a second side of the antenna module.

Figure 14:
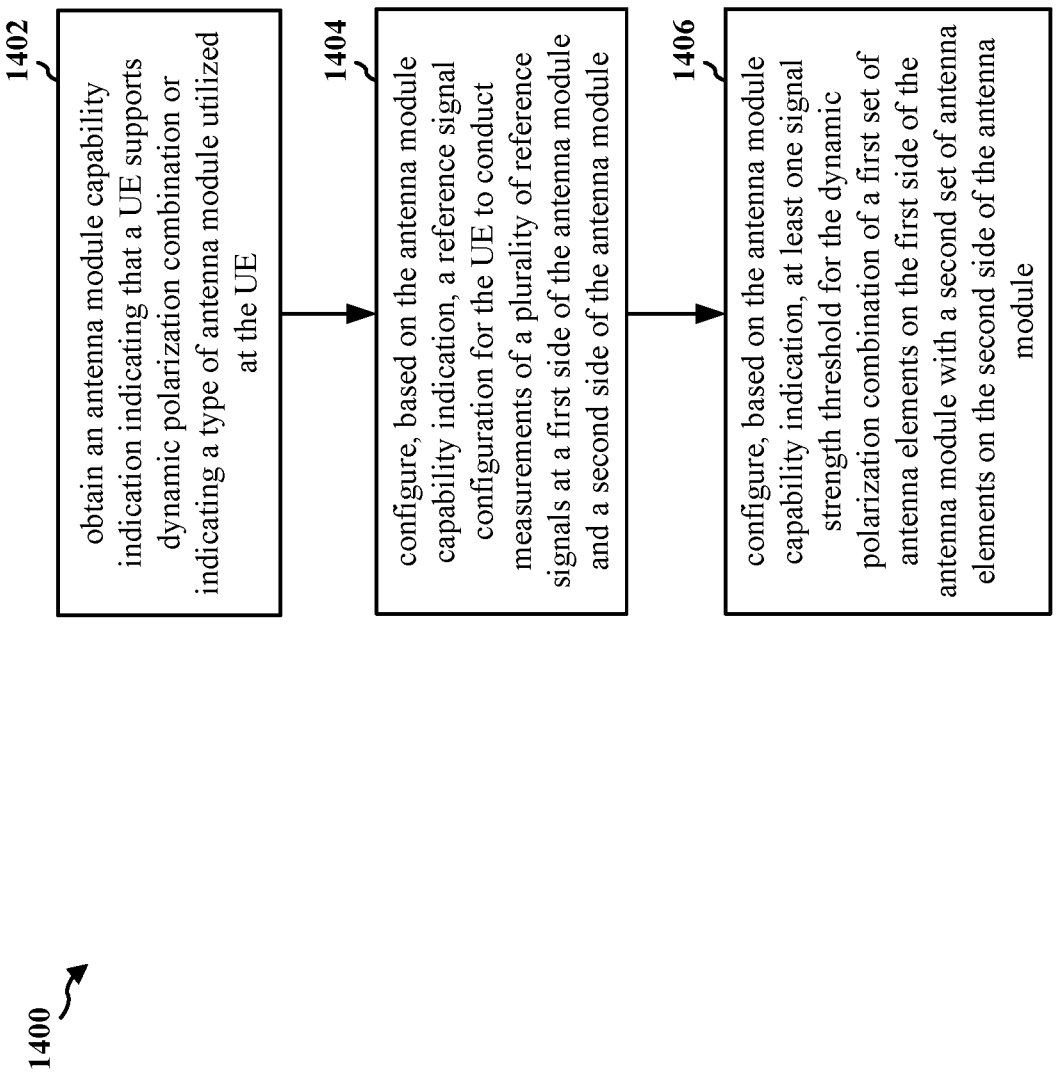
FIG. 14 is a flowchart of a method of wireless communication.

FIG. 14 is a flowchart 1400 of a method of wireless communication. The method may be performed by a base station (e.g., the base station 102; the network entity 1502. One or more of the illustrated operations may be omitted, transposed, or contemporaneous. The method may configure a UE to perform dynamic polarization combining of antenna elements of an antenna module having two or more sides.

At 1402, the network entity may obtain an antenna module capability indication. For example, 1402 may be performed by configuration component 199 of network entity 1502. The network entity may obtain the antenna module capability indication from a UE. The antenna module capability indication may indicate that the UE supports dynamic polarization combination. The antenna module capability indication may indicate a type of antenna module utilized at the UE. In some aspects, the type of the antenna module used indicated in the antenna module capability indication may be an antenna module that comprises two or more sides. In some aspects, the antenna module comprises two sides such that the antenna module has an L-shaped design.

At 1404, the network entity may configure a reference signal configuration for the UE. For example, 1404 may be performed by configuration component 199 of network entity 1502. The network entity may configure, based on the antenna module capability indication, the reference signal configuration for the UE to conduct measurements of a plurality of reference signals at a first side of the antenna module and a second side of the antenna module.

At 1406, the network entity may configure at least one signal strength threshold for the dynamic polarization combination. For example, 1406 may be performed by configuration component 199 of network entity 1502. The network entity may configure, based on the antenna module capability indication, the at least one signal strength threshold for the dynamic polarization combination of a first set of antenna elements on the first side of the antenna module with a second set of antenna elements on the second side of the antenna module.

Figure 15:
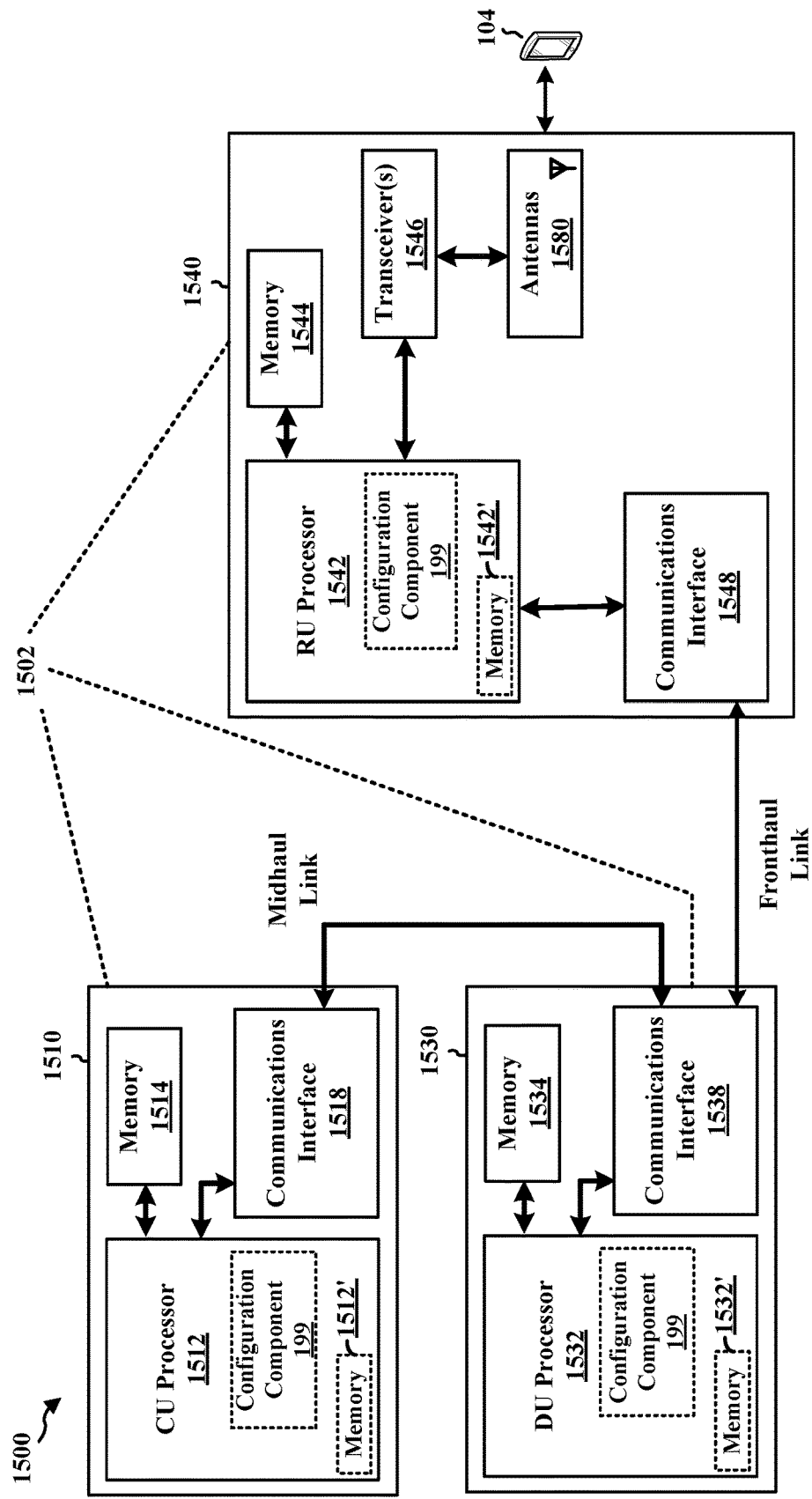
FIG. 15 is a diagram illustrating an example of a hardware implementation for an example network entity.

FIG. 15 is a diagram 1500 illustrating an example of a hardware implementation for a network entity 1502. The network entity 1502 may be a BS, a component of a BS, or may implement BS functionality. The network entity 1502 may include at least one of a CU 1510, a DU 1530, or an RU 1540. For example, depending on the layer functionality handled by the component 199, the network entity 1502 may include the CU 1510; both the CU 1510 and the DU 1530; each of the CU 1510, the DU 1530, and the RU 1540; the DU 1530; both the DU 1530 and the RU 1540; or the RU 1540. The CU 1510 may include a CU processor 1512. The CU processor 1512 may include on-chip memory 1512'. In some aspects, the CU 1510 may further include additional memory modules 1514 and a communications interface 1518. The CU 1510 communicates with the DU 1530 through a midhaul link, such as an F1 interface. The DU 1530 may include a DU processor 1532. The DU processor 1532 may include on-chip memory 1532'. In some aspects, the DU 1530 may further include additional memory modules 1534 and a communications interface 1538. The DU 1530 communicates with the RU 1540 through a fronthaul link. The RU 1540 may include an RU processor 1542. The RU processor 1542 may include on-chip memory 1542'. In some aspects, the RU 1540 may further include additional memory modules 1544, one or more transceivers 1546, antennas 1580, and a communications interface 1548. The RU 1540 communicates with the UE 104. The on-chip memory 1512', 1532', 1542' and the additional memory modules 1514, 1534, 1544 may each be considered a computer-readable medium/memory. Each computer-readable medium/memory may be non-transitory. Each of the processors 1512, 1532, 1542 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 is configured to obtain an antenna module capability indication indicating that a UE supports dynamic polarization combination or indicating a type of antenna module utilized at the UE; and configure, based on the antenna module capability indication, a reference signal configuration for the UE to conduct measurements of a plurality of reference signals at a first side of the antenna module and a second side of the antenna module. The component 199 may be within one or more processors of one or more of the CU 1510, DU 1530, and the RU 1540. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1502 may include a variety of components configured for various functions. In one configuration, the network entity 1502 includes means for obtaining an antenna module capability indication indicating that a UE supports dynamic polarization combination or indicating a type of antenna module utilized at the UE. The network entity includes means for configuring, based on the antenna module capability indication, a reference signal configuration for the UE to conduct measurements of a plurality of reference signals at a first side of the antenna module and a second side of the antenna module. The network entity further includes means for configuring, based on the antenna module capability indication, at least one signal strength threshold for the dynamic polarization combination of a first set of antenna elements on the first side of the antenna module with a second set of antenna elements on the second side of the antenna module. The means may be the component 199 of the network entity 1502 configured to perform the functions recited by the means. As described supra, the network entity 1502 may include the TX processor 316, the RX processor 370, and the controller/processor 375. As such, in one configuration, the means may be the TX processor 316, the RX processor 370, and/or the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE comprising identifying a first polarization of a first set of antenna elements on a first side of an antenna module having two or more sides; identifying a second polarization of a second set of antenna elements on a second side of the antenna module; determining, for an antenna layer, a dynamic polarization combination between the first set of antenna elements having the first polarization with the second set of antenna elements having the second polarization; and communicating with a network node via the antenna module based on the dynamic polarization combination.

Aspect 2 is the method of aspect 1, further includes that the antenna module comprises two sides, and wherein the dynamic polarization combination is based on at least one of an angle of interest, an angular spread, or a UE design.

Aspect 3 is the method of any of aspects 1 and 2, further including identifying a first subset of antenna elements associated with the second polarization on the first side of the antenna module; identifying a second subset of antenna elements associated with the first polarization on the second side of the antenna module; and combining the first subset of antenna elements on the first side of the antenna module having the second polarization with the second subset of antenna elements on the second side of the antenna module having a polarization opposite the second set of antenna elements on the second side of the antenna module combined with the first set of antenna elements on the first side of the antenna module.

Aspect 4 is the method of any of aspects 1-3, further includes that the first polarization and the second polarization are orthogonal to each other.

Aspect 5 is the method of any of aspects 1-4, further including measuring a plurality of reference signals at the first side of the antenna module and at the second side of the antenna module, wherein the UE determines the dynamic polarization combination based on measurements of the plurality of reference signals at the first side of the antenna module and the second side of the antenna module.

Aspect 6 is the method of any of aspects 1-5, further including activating antenna elements on the first side to conduct a measurement of the plurality of reference signals for a first measurement occasion; activating antenna elements on the second side to conduct the measurement of the plurality of reference signals for a second measurement occasion; and comparing the measurements of the plurality of reference signals over the first measurement occasion and the second measurement occasion to determine the dynamic polarization combination.

Aspect 7 is the method of any of aspects 1-6, further includes that the antenna elements on the second side of the antenna module not combined with the first set of antenna elements on the first side of the antenna module are deactivated or are not used for transmissions or receptions.

Aspect 8 is the method of any of aspects 1-7, further including transmitting an antenna module capability indication indicating support for the dynamic polarization combination or indicating a type of the antenna module used; and receiving at least one of a reference signal configuration to conduct the measurements of the plurality of reference signals at the first side of the antenna module and the second side of the antenna module; or at least one signal strength threshold for the dynamic polarization combination of the first set of antenna elements on the first side of the antenna module with a set of antenna elements on the second side of the antenna module.

Aspect 9 is the method of any of aspects 1-8, further includes that the dynamic polarization combination includes combining across multiple antenna modules, wherein the dynamic polarization combination of at least the first set of antenna elements on the first side of the antenna module with the second set of antenna elements on the second side of the antenna module includes a mapping of ports or layers between the first set of antenna elements on the first side of the antenna module and the second set of antenna elements on the second side of the antenna module that are then demultiplexed in different combinations of antenna elements.

Aspect 10 is the method of any of aspects 1-9, further includes that the dynamic polarization combination of at least the first set of antenna elements on the first side of the antenna module with the second set of antenna elements on the second side of the antenna module is based on a fixed mapping of a number of antenna feeds between the first set of antenna elements on the first side of the antenna module and the second set of antenna elements on the second side of the antenna module, the dynamic polarization combination achieved at an IF in a superheterodyne architecture, or at a baseband.

Aspect 11 is the method of any of aspects 1-10, further including controlling an amplitude for each antenna element, including assigning a weight value to one or more antenna elements having a lower gain than other antenna elements.

Aspect 12 is an apparatus for wireless communication at a network entity including at least one processor coupled to a memory and at least one transceiver, the at least one processor configured to implement any of Aspects 1-11.

Aspect 13 is an apparatus for wireless communication at a network entity including means for implementing any of Aspects 1-12.

Aspect 14 is a computer-readable medium storing computer executable code, where the code when executed by a processor causes the processor to implement any of Aspects 1-12.

Aspect 15 is a method of wireless communication at a network entity comprising obtaining an antenna module capability indication indicating that a UE supports dynamic polarization combination or indicating a type of antenna module utilized at the UE; and configuring, based on the antenna module capability indication, a reference signal configuration for the UE to conduct measurements of a plurality of reference signals at a first side of the antenna module and a second side of the antenna module.

Aspect 16 is the method of aspect 15, further including configuring, based on the antenna module capability indication, at least one signal strength threshold for the dynamic polarization combination of a first set of antenna elements on the first side of the antenna module with a second set of antenna elements on the second side of the antenna module.

Aspect 17 is the method of any of aspects 15 and 16, further includes that the type of the antenna module used is indicated in the antenna module capability indication comprises two or more sides.

Aspect 18 is an apparatus for wireless communication at a network entity including at least one processor coupled to a memory and at least one transceiver, the at least one processor configured to implement any of Aspects 15-17.

Aspect 19 is an apparatus for wireless communication at a network entity including means for implementing any of Aspects 15-17.

Aspect 20 is a computer-readable medium storing computer executable code, where the code when executed by a processor causes the processor to implement any of Aspects 15-17.

What is claimed is:

1. An apparatus for wireless communication at a user equipment (UE), comprising:
   a memory; and
   at least one processor coupled to the memory and, based at least in part on information stored in the memory, the at least one processor is configured to:
   identify a first polarization of a first set of antenna elements on a first side of an antenna module having two or more sides;
   identify a second polarization of a second set of antenna elements on a second side of the antenna module;
   determine, for an antenna layer, a dynamic polarization combination between the first set of antenna elements having the first polarization with the second set of antenna elements having the second polarization; and
   communicate with a network node via the antenna module based on the dynamic polarization combination.

2. The apparatus of claim 1, further comprising a transceiver coupled to the at least one processor.

3. The apparatus of claim 1, wherein the antenna module comprises two sides, and wherein the dynamic polarization combination is based on at least one of an angle of interest, an angular spread, or a UE design.

4. The apparatus of claim 1, wherein the at least one processor is configured to:
   identify a first subset of antenna elements associated with the second polarization on the first side of the antenna module;
   identify a second subset of antenna elements associated with the first polarization on the second side of the antenna module; and
   combine the first subset of antenna elements on the first side of the antenna module having the second polarization with the second subset of antenna elements on the second side of the antenna module having a polarization opposite the second set of antenna elements on the second side of the antenna module combined with the first set of antenna elements on the first side of the antenna module.

5. The apparatus of claim 4, wherein the first polarization and the second polarization are orthogonal to each other.

6. The apparatus of claim 1, wherein the at least one processor is configured to:
   measure a plurality of reference signals at the first side of the antenna module and at the second side of the antenna module, wherein the UE determines the dynamic polarization combination based on measurements of the plurality of reference signals at the first side of the antenna module and the second side of the antenna module.

7. The apparatus of claim 6, wherein to measure the plurality of reference signals at the first side of the antenna module and at the second side of the antenna module, the at least one processor is configured to:
   activate antenna elements on the first side to conduct a measurement of the plurality of reference signals for a first measurement occasion;
   activate antenna elements on the second side to conduct the measurement of the plurality of reference signals for a second measurement occasion; and
   compare the measurements of the plurality of reference signals over the first measurement occasion and the second measurement occasion to determine the dynamic polarization combination.

8. The apparatus of claim 7, wherein the antenna elements on the second side of the antenna module not combined with the first set of antenna elements on the first side of the antenna module are deactivated or are not used for transmissions or receptions.

9. The apparatus of claim 6, wherein the at least one processor is configured to:
   transmit an antenna module capability indication indicating support for the dynamic polarization combination or indicating a type of the antenna module used; and
   receive at least one of:
   a reference signal configuration to conduct the measurements of the plurality of reference signals at the first side of the antenna module and the second side of the antenna module; or
   at least one signal strength threshold for the dynamic polarization combination of the first set of antenna elements on the first side of the antenna module with a set of antenna elements on the second side of the antenna module.

10. The apparatus of claim 1, wherein the dynamic polarization combination includes combining across multiple antenna modules, wherein the dynamic polarization combination of at least the first set of antenna elements on the first side of the antenna module with the second set of antenna elements on the second side of the antenna module includes a mapping of ports or layers between the first set of antenna elements on the first side of the antenna module and the second set of antenna elements on the second side of the antenna module that are then demultiplexed in different combinations of antenna elements.

11. The apparatus of claim 1, wherein the dynamic polarization combination of at least the first set of antenna elements on the first side of the antenna module with the second set of antenna elements on the second side of the antenna module is based on a fixed mapping of a number of antenna feeds between the first set of antenna elements on the first side of the antenna module and the second set of antenna elements on the second side of the antenna module, the dynamic polarization combination achieved at an intermediate frequency (IF) in a superheterodyne architecture, or at a baseband.

12. The apparatus of claim 1, wherein the at least one processor is configured to:
   control an amplitude for each antenna element, including assigning a weight value to one or more antenna elements having a lower gain than other antenna elements.

13. A method of wireless communication at a user equipment (UE), comprising:
   identifying a first polarization of a first set of antenna elements on a first side of an antenna module having two or more sides;
   identifying a second polarization of a second set of antenna elements on a second side of the antenna module;

determining, for an antenna layer, a dynamic polarization combination between the first set of antenna elements having the first polarization with the second set of antenna elements having the second polarization; and communicating with a network node via the antenna module based on the dynamic polarization combination.

14. The method of claim 13, wherein the antenna module comprises two sides, and wherein the dynamic polarization combination is based on at least one of an angle of interest, an angular spread, or a UE design.

15. The method of claim 13, further comprising:
identifying a first subset of antenna elements associated with the second polarization on the first side of the antenna module;
identifying a second subset of antenna elements associated with the first polarization on the second side of the antenna module; and
combining the first subset of antenna elements on the first side of the antenna module having the second polarization with the second subset of antenna elements on the second side of the antenna module having a polarization opposite the second set of antenna elements on the second side of the antenna module combined with the first set of antenna elements on the first side of the antenna module.

16. The method of claim 15, wherein the first polarization and the second polarization are orthogonal to each other.

17. The method of claim 13, further comprising:
measuring a plurality of reference signals at the first side of the antenna module and at the second side of the antenna module, wherein the UE determines the dynamic polarization combination based on measurements of the plurality of reference signals at the first side of the antenna module and the second side of the antenna module.

18. The method of claim 17, wherein the measuring the plurality of reference signals at the first side of the antenna module and at the second side of the antenna module, further comprising:
activating antenna elements on the first side to conduct a measurement of the plurality of reference signals for a first measurement occasion;
activating antenna elements on the second side to conduct the measurement of the plurality of reference signals for a second measurement occasion; and
comparing the measurements of the plurality of reference signals over the first measurement occasion and the second measurement occasion to determine the dynamic polarization combination.

19. The method of claim 18, wherein the antenna elements on the second side of the antenna module not combined with the first set of antenna elements on the first side of the antenna module are deactivated or are not used for transmissions or receptions.

20. The method of claim 17, further comprising:
transmitting an antenna module capability indication indicating support for the dynamic polarization combination or indicating a type of the antenna module used; and
receiving at least one of:
a reference signal configuration to conduct measurements of the plurality of reference signals at the first side of the antenna module and the second side of the antenna module; or
at least one signal strength threshold for the dynamic polarization combination of the first set of antenna elements on the first side of the antenna module with a set of antenna elements on the second side of the antenna module.

21. The method of claim 13, wherein the dynamic polarization combination includes combining across multiple antenna modules, wherein the dynamic polarization combination of at least the first set of antenna elements on the first side of the antenna module with the second set of antenna elements on the second side of the antenna module includes a mapping of ports or layers between the first set of antenna elements on the first side of the antenna module and the second set of antenna elements on the second side of the antenna module that are then demultiplexed in different combinations of antenna elements.

22. The method of claim 13, wherein the dynamic polarization combination of at least the first set of antenna elements on the first side of the antenna module with the second set of antenna elements on the second side of the antenna module is based on a fixed mapping of a number of antenna feeds between the first set of antenna elements on the first side of the antenna module and the second set of antenna elements on the second side of the antenna module, the dynamic polarization combination achieved at an intermediate frequency (IF) in a superheterodyne architecture, or at a baseband.

23. The method of claim 13, further comprising:
controlling an amplitude for each antenna element, including assigning a weight value to one or more antenna elements having a lower gain than other antenna elements.

24. An apparatus for wireless communication at a network entity, comprising:
a memory; and
at least one processor coupled to the memory and, based at least in part on information stored in the memory, the at least one processor is configured to:
obtain an antenna module capability indication indicating that a user equipment (UE) supports dynamic polarization combination or indicating a type of antenna module utilized at the UE; and
configure, based on the antenna module capability indication, a reference signal configuration for the UE to conduct measurements of a plurality of reference signals at a first side of the antenna module and a second side of the antenna module.

25. The apparatus of claim 24, further comprising a transceiver coupled to the at least one processor.

26. The apparatus of claim 24, wherein the at least one processor is configured to:
configure, based on the antenna module capability indication, at least one signal strength threshold for the dynamic polarization combination of a first set of antenna elements on the first side of the antenna module with a second set of antenna elements on the second side of the antenna module.

27. The apparatus of claim 24, wherein the type of the antenna module used is indicated in the antenna module capability indication comprises two or more sides.

28. A method of wireless communication at a network entity, comprising:
obtaining an antenna module capability indication indicating that a user equipment (UE) supports dynamic polarization combination or indicating a type of antenna module utilized at the UE; and
configuring, based on the antenna module capability indication, a reference signal configuration for the UE to conduct measurements of a plurality of reference signals at a first side of the antenna module and a second side of the antenna module.

29. The method of claim 28, further comprising:

configuring, based on the antenna module capability indication, at least one signal strength threshold for the dynamic polarization combination of a first set of antenna elements on the first side of the antenna module with a second set of antenna elements on the second side of the antenna module.

30. The method of claim 28, wherein the type of the antenna module used is indicated in the antenna module capability indication comprises two or more sides.

\* \* \* \* \*